United States Patent
Huang et al.

(10) Patent No.: US 12,289,688 B2
(45) Date of Patent: Apr. 29, 2025

(54) SIGNAL TRANSMISSION METHOD, NETWORK DEVICE AND TERMINAL DEVICE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 630 days.

(21) Appl. No.: 17/607,377

(22) PCT Filed: Apr. 23, 2020

(86) PCT No.: PCT/CN2020/086518
§ 371 (c)(1),
(2) Date: Oct. 28, 2021

(87) PCT Pub. No.: WO2020/221108
PCT Pub. Date: Nov. 5, 2020

(65) Prior Publication Data
US 2022/0217646 A1 Jul. 7, 2022

(30) Foreign Application Priority Data
Apr. 30, 2019 (CN) .......................... 201910365525.8

(51) Int. Cl.
H04W 52/14 (2009.01)
H04L 5/00 (2006.01)
(Continued)

(52) U.S. Cl.
CPC .......... H04W 52/146 (2013.01); H04L 5/0048 (2013.01); H04W 72/0473 (2013.01); H04W 72/23 (2023.01)

(58) Field of Classification Search
CPC ........... H04W 52/146; H04W 72/0473; H04W 72/23; H04W 52/346; H04W 52/367;
(Continued)

(56) References Cited

U.S. PATENT DOCUMENTS

2017/0359808 A1* 12/2017 Dinan .................... H04L 5/0053
2018/0103433 A1* 4/2018 Li ........................ H04W 52/146
(Continued)

FOREIGN PATENT DOCUMENTS

CN 103688580 A 3/2014
CN 111050390 A 4/2020
(Continued)

OTHER PUBLICATIONS

Chen et al., "Uplink Power Control Method and Device", May 22, 2020, WO English translation of WO 2020098631. (Year: 2020).*
(Continued)

*Primary Examiner* — Michael K Phillips
(74) *Attorney, Agent, or Firm* — Kilpatrick Townsend & Stockton LLP

(57) ABSTRACT

Disclosed in the present application are a signal transmission method, a network device and a UE, the method comprising: a network device determining a first instruction message, the first instruction message instructing a UE to use a first power control policy and/or a first transmission mode to send a first signal; and the network device sending the first instruction message to the UE. The problem in the prior art in which a UE cannot be controlled to use full power to send an uplink signal is solved.

20 Claims, 9 Drawing Sheets

Determining, by a network device, a first indication message, wherein the first indication message is configured to indicate a terminal device to send a first signal by using a first power control policy and/or a first transmission mode — S201

Sending, by the network device, the first indication message to the terminal device — S202

(51) Int. Cl.
*H04W 72/044* (2023.01)
*H04W 72/23* (2023.01)

(58) Field of Classification Search
CPC . H04W 52/42; H04W 72/231; H04W 72/232; H04W 72/21; H04L 5/0048; H04L 5/0007; H04L 5/0051; H04L 5/0053
See application file for complete search history.

(56) References Cited

U.S. PATENT DOCUMENTS

| | | | |
|---|---|---|---|
| 2019/0349866 A1* | 11/2019 | Lin | H04W 52/242 |
| 2019/0372732 A1* | 12/2019 | Faxér | H04B 7/0691 |
| 2020/0154364 A1* | 5/2020 | Rahman | H04B 7/0404 |
| 2020/0336998 A1* | 10/2020 | Rahman | H04W 8/24 |
| 2020/0351798 A1* | 11/2020 | Ji | H04W 52/10 |
| 2021/0235386 A1* | 7/2021 | Zhang | H04W 52/42 |
| 2021/0235389 A1* | 7/2021 | Yao | H04W 72/23 |
| 2021/0377876 A1* | 12/2021 | Jeon | H04W 24/08 |

FOREIGN PATENT DOCUMENTS

| | | |
|---|---|---|
| CN | 111182619 A | 5/2020 |
| WO | WO-2020098631 A1 * 5/2020 | ........... H04B 7/0404 |

OTHER PUBLICATIONS

Huawei et al., "Enhancements on UL MIMO with multiple PAs to allow full power transmission", 3GPP TSG RAN WG1 Meeting #96, Athens, Greece, Feb. 25-Mar. 1, 2019, total 6 pages, R1-1901569.
Vivo, "Feature lead summary on Full TX Power UL transmission", 3GPP TSG RAN WG1#96, Athens, Greece, Feb. 25-Mar. 1, 2019, total 19 pages, R1-1903410.
LG Electronics, "Discussions on full Tx power uplink transmission", 3GPP TSG RAN WG1 #96bis, Xi'an, China, Apr. 8-12, 2019, total 5 pages, R1-1904210.
CATT,"Remaining issues on non-codebook based UL transmission", 3GPP TSG RAN WG1 Meeting #93, Busan, Korea, May 21-25, 2018, total 7 pages, R1-1806277.
Ericsson, "On full power UL transmission", 3GPP TSG RAN WG1 Meeting #96-bis, Xi'an, China, Apr. 8-12, 2019, total 22 pages, R1-1904847.

* cited by examiner

| Precoding matrix information index (TPMI index) | $W$ | | | | | | | |
|---|---|---|---|---|---|---|---|---|
| 0 – 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | - | - |

FIG. 4A

| Precoding matrix information index (TPMI index) | $W$ | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - | - |

FIG. 4B

| Precoding matrix information index (TPMI index) | $W$ | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | - | - | - | - |

FIG. 4C

| Precoding matrix information index (TPMI index) | $W$ | | | |
|---|---|---|---|---|
| 0 – 2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ | |

FIG. 4D

| Precoding matrix information index (TPMI index) | $W$ | | | |
|---|---|---|---|---|
| 0 – 3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4 – 7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8 – 11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12 – 15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16 – 19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20 – 21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | - | - |

FIG. 4E

| Precoding matrix information index (TPMI index) | $W$ | | | |
|---|---|---|---|---|
| 0 – 3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 – 6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | - |

FIG. 4F

| Precoding matrix information index (TPMI index) | $W$ | | | |
|---|---|---|---|---|
| 0 – 3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | - | - | - |

FIG. 4G

SIGNAL TRANSMISSION METHOD, NETWORK DEVICE AND TERMINAL DEVICE

CROSS REFERENCE TO RELATED APPLICATIONS

The present application is a National Stage of International Application No. PCT/CN2020/086518, filed on Apr. 23, 2020, which claims priority to Chinese patent application No. 201910365525.8 filed on Apr. 30, 2019 to China National Intellectual Property Administration, the entire content of which are incorporated herein by reference.

FIELD

The present application relates to the field of communication technology, in particular to a signal transmission method, a network device and a user equipment.

BACKGROUND

At present, under codebook design of a 3rd generation partnership project (3GPP) new radio (NR) system, for uplink transmission based on a codebook, a user equipment (UE) with a coherent transmission capability, a partial antenna coherent transmission capability and a non-coherent transmission capability always sends uplink signals using a precoding matrix indicated by a base station through a transmit precoding matrix indicator (TPMI), that is, the UE always sends the uplink signals using the same uplink power control policy and the same uplink transmission mode, and a UE cannot control the sending power of the uplink signals using a power control policy and/or transmission mode other than the codebook. This scheduling manner is not flexible, resulting in poor transmission performance of the UE.

It can be seen that a current uplink multiple input multiple output (MIMO) multi-antenna power allocation mechanism cannot ensure that: under a codebook-based uplink transmission solution, the UE with the partial antenna coherent transmission capability and the non-coherent transmission capability sends the uplink signals by scheduling different power control policies and/or transmission modes based on the channel state, that is, the UE sends the uplink signals with full power. At present, a solution of sending the uplink signals by the UE at full power is studied in the Release 16 version of the NR system, however, there is no definite solution on how to control the UE to send the uplink signals at full power.

SUMMARY

The present application provides a signal transmission method, a network device and a UE, to solve the problem in the prior art in which UE cannot be controlled to send uplink signals with full power.

One embodiment of the present disclosure provides a signal transmission method, including: determining, by a network device, a first indication message, and the first indication message is configured to indicate a UE to send a first signal by using a first power control policy and/or a first transmission mode; and sending, by the network device, the first indication message to the UE.

In one embodiment, the first indication message is carried in a first field of downlink control information (DCI).

In one embodiment, the first field is a pre-defined field, or a precoding information and stream quantity field, or a sounding reference signal resource indicator (SRI) field, or a demodulation reference signal (DMRS) port indication field of the DCI.

In one embodiment, in response to the first field being the SRI field, the first field occupies at least two bits.

In one embodiment, the first field includes a plurality of states, and different states in the plurality of states indicate different first power control policies and/or first transmission modes to send the first signal.

In one embodiment, the plurality of states include at least one of the following: the first field includes at least two states which indicate the different first power control policies; the first field includes at least one state which indicates codebook subset restriction information of the UE; the first field includes at least one state which indicates a quantity of transmission streams of the first signal; or the first field includes at least two states which indicate the first transmission mode.

In one embodiment, the first power control policy includes at least one of the following.

The UE is configured to uniformly allocate first sending power to antenna ports where the first signal has non-zero transmission of data, and the first sending power refers to sending power worked out by the UE according to an uplink power control formula.

The UE is configured to perform scaling on first sending power through a first scale factor and then uniformly allocate the first sending power to each antenna port sending the first signal; and the first scale factor is a ratio of a quantity of antenna ports where the first signal has non-zero transmission of data to a quantity of antenna ports contained in SRS resources indicated by scheduling information of the first signal.

In response to that each antenna port sending the first signal is available to reach largest output power supported by a power class of the UE, the UE is configured to uniformly allocate first sending power to antenna ports where the first signal has non-zero transmission of data; in response to that any one of antenna ports sending the first signal does not reach the largest output power supported by the power class of the UE, the UE is configured to perform scaling on the first sending power through a second scale factor, and then uniformly allocate the first sending power to the antenna ports where the first signal has non-zero transmission of data; and the second scale factor is a ratio of a quantity of the antenna ports where the first signal has non-zero transmission of data to a largest quantity of antenna ports contained in one SRS resource supported by the UE.

The UE is configured to perform scaling on first sending power through a third scale factor, and then uniformly allocate the first sending power to antenna ports where the first signal has non-zero transmission of data; and the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

The UE is configured to adopt a power control policy corresponding to a quantity of the antenna ports contained in SRS resources indicated by scheduling information of the first signal.

Or, the UE is configured to perform scaling on first sending power through a fourth scale factor, and then uniformly allocate the first sending power to each antenna port sending the first signal; and the fourth scale factor is a scale coefficient self-defined by the UE.

In one embodiment, the first transmission mode includes at least one of the following: the UE is configured to adopt CDD to send the first signal; the UE is configured to adopt different delays on different coherent transmission antenna groups; one antenna port sending the first signal of the UE corresponds to at least two antenna ports contained in SRS resources indicated by scheduling information of the first signal; or the UE is configured to transmit the first signal after precoding the first signal through a pre-defined precoding matrix.

In one embodiment, the first indication message is further configured to indicate at least one piece of the following information: a codebook subset restriction information corresponding to the first signal; a quantity of transmission streams corresponding to the first signal; a precoding matrix information number corresponding to the first signal; or SRS resources corresponding to the first signal.

In one embodiment, the first indication message is further configured to indicate a quantity of transmission streams of the first signal and indicates the UE to send the first signal by adopting the quantity of the transmission streams indicated by the first indication message; or the first indication message is configured to indicate the UE to send the first signal by adopting a default quantity of transmission streams for the UE; or the first indication message is configured to indicate the UE to send the first signal by adopting a quantity of transmission streams pre-defined in a protocol.

In one embodiment, the first transmission mode is that the UE is configured to send the first signal by adopting a self-defined precoding matrix and using the quantity of the transmission streams; and the first power control policy is that: the UE is configured to send the first signal with first sending power.

In one embodiment, the first field contains at least one state which indicates the UE not to perform full-power sending.

In one embodiment, the first signal includes: a physical uplink shared channel (PUSCH) or a physical uplink control channel (PUCCH).

In one embodiment, the first power control policy and/or the first transmission mode include/includes: a power control policy that the UE is configured to send the first signal with full power; and/or a transmission mode that the UE is configured to send the first signal with full power.

Another embodiment of the present disclosure provides a signal transmission method, including: receiving, by a UE, a first indication message sent by a network device, and the first indication message is configured to indicate the UE to send a first signal by using a first power control policy and/or a first transmission mode; determining, by the UE, the first power control policy and/or the first transmission mode based on the first indication message; and sending, by the UE, the first signal based on the first power control policy and/or the first transmission mode.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, in response to the first field being the SRI field, the first field occupies at least two bits.

In one embodiment, the first field includes a plurality of states, and different states in the plurality of states indicate different first power control policies or first transmission modes.

In one embodiment, the plurality of states include at least one of the following: the first field includes at least two states which indicate the different first power control policies; the first field includes at least one state which indicates codebook subset restriction information of the UE; the first field includes at least one state which indicates a quantity of transmission streams of the first signal; or the first field includes at least two states which indicate the first transmission mode.

In one embodiment, the first power control policy includes at least one of the following.

The UE is configured to uniformly allocate first sending power to antenna ports where the first signal has non-zero transmission of data, and the first sending power refers to sending power worked out by the UE according to an uplink power control formula.

The UE is configured to perform scaling on first sending power through a first scale factor and then uniformly allocate the first sending power to each antenna port sending the first signal; and the first scale factor is a ratio of a quantity of antenna ports where the first signal has non-zero transmission of data to a quantity of antenna ports contained in SRS resources indicated by scheduling information of the first signal.

In response to that each antenna port sending the first signal is available to reach largest output power supported by a power class of the UE, the UE is configured to uniformly allocate first sending power to antenna ports where the first signal has non-zero transmission of data; in response to that any one of antenna ports sending the first signal does not reach the largest output power supported by the power class of the UE, the UE is configured to perform scaling on the first sending power through a second scale factor, and then uniformly allocate the first sending power to the antenna ports where the first signal has non-zero transmission of data; and the second scale factor is a ratio of a quantity of the antenna ports where the first signal has non-zero transmission of data to a largest quantity of antenna ports contained in one SRS resource supported by the UE.

The UE is configured to perform scaling on first sending power through a third scale factor, and then uniformly allocate the first sending power to antenna ports where the first signal has non-zero transmission of data; and the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

The UE is configured to adopt a power control policy corresponding to a quantity of the antenna ports contained in SRS resources indicated by scheduling information of the first signal.

Or, the UE is configured to perform scaling on first sending power through a fourth scale factor, and then uniformly allocate the first sending power to each antenna port sending the first signal; and the fourth scale factor is a scale coefficient self-defined by the UE.

In one embodiment, the first transmission mode includes at least one of the following: the UE is configured to adopt CDD to send the first signal; the UE is configured to adopt different delays on different coherent transmission antenna groups; one antenna port sending the first signal of the UE corresponds to at least two antenna ports contained in SRS resources indicated by an SRI; or the UE is configured to transmit the first signal after precoding the first signal through a pre-defined precoding matrix.

In one embodiment, the method further includes: indicating, by the first indication message, at least one piece of following information: a codebook subset restriction information corresponding to the first signal; a quantity of transmission streams corresponding to the first signal; a precoding matrix information number corresponding to the first signal; or SRS resources corresponding to the first signal.

In one embodiment, the method further includes: determining, by the UE, a codebook subset according to the codebook subset restriction information and sending, by the UE, the first signal based on the codebook subset in response to that the codebook subset restriction information indicated by the first indication message is detected by the UE; or sending, by the UE, the first signal based on the quantity of the transmission streams in response to that the quantity of the transmission streams indicated by the first indication message is detected by the UE; or determining, by the UE, a precoding matrix based on the precoding matrix information number and sending, by the UE, the first signal after precoding the first signal based on the precoding matrix, in response to that the precoding matrix information number indicated by the first indication message is detected by the UE.

In one embodiment, the first indication message is further configured to indicate a quantity of transmission streams of the first signal and indicate the UE to send the first signal by adopting the quantity of the transmission streams indicated by the first indication message; or the first indication message is configured to indicate the UE to send the first signal by adopting a default quantity of transmission streams for the UE; or the first indication message is configured to indicate the UE to send the first signal by adopting a quantity of transmission streams pre-defined in a protocol.

In one embodiment, the first transmission mode is that the UE is configured to send the first signal by adopting a self-defined precoding matrix and using the quantity of the transmission streams; and the first power control policy is that: the UE is configured to send the first signal with first sending power, and the first sending power refers to sending power worked out by the UE according to an uplink power control formula.

In one embodiment, the first signal includes: a PUSCH or a PUCCH.

In yet another embodiment of the present disclosure provides a network device, including: a memory, configured to store an instruction; and a processor, configured to read the instruction in the memory to: determine a first indication message, and the first indication message is configured to indicate a UE to send a first signal by using a first power control policy and/or a first transmission mode; and a transceiver, configured to send the first indication message to the UE.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, in response to the first field being the SRI field, the first field occupies at least two bits.

In one embodiment, the first field includes a plurality of states, and different states in the plurality of states indicate different first power control policies or first transmission modes.

In one embodiment, the plurality of states include at least one of the following: the first field includes at least two states which indicate the different first power control policies; the first field includes at least one state which indicates codebook subset restriction information of the UE; the first field includes at least one state which indicates a quantity of transmission streams of the first signal; or the first field includes at least two states which indicate the first transmission mode.

In one embodiment, the first power control policy includes at least one of the following.

The UE is configured to uniformly allocate first sending power to antenna ports where the first signal has non-zero transmission of data, and the first sending power refers to sending power worked out by the UE according to an uplink power control formula.

The UE is configured to perform scaling on first sending power through a first scale factor and then uniformly allocate the first sending power to each antenna port sending the first signal; and the first scale factor is a ratio of a quantity of antenna ports where the first signal has non-zero transmission of data to a quantity of antenna ports contained in SRS resources indicated by scheduling information of the first signal.

In response to that each antenna port sending the first signal is available to reach largest output power supported by a power class of the UE, the UE is configured to uniformly allocate first sending power to antenna ports where the first signal has non-zero transmission of data; in response to that any one of antenna ports sending the first signal does not reach the largest output power supported by the power class of the UE, the UE is configured to perform scaling on the first sending power through a second scale factor, and then uniformly allocate the first sending power to the antenna ports where the first signal has non-zero transmission of data; and the second scale factor is a ratio of a quantity of the antenna ports where the first signal has non-zero transmission of data to a largest quantity of antenna ports contained in one SRS resource supported by the UE.

The UE is configured to perform scaling on first sending power through a third scale factor, and then uniformly allocate the first sending power to antenna ports where the first signal has non-zero transmission of data; and the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

The UE is configured to adopt a power control policy corresponding to a quantity of the antenna ports contained in SRS resources indicated by scheduling information of the first signal.

Or, the UE is configured to perform scaling on first sending power through a fourth scale factor, and then uniformly allocate the first sending power to each antenna port sending the first signal; and the fourth scale factor is a scale coefficient self-defined by the UE.

In one embodiment, the first transmission mode includes at least one of the following: the UE is configured to adopt CDD to send the first signal; the UE is configured to adopt different delays on different coherent transmission antenna groups; one antenna port sending the first signal of the UE corresponds to at least two antenna ports contained in SRS resources indicated by scheduling information of the first signal; or the UE is configured to transmit the first signal after precoding the first signal through a pre-defined precoding matrix.

In one embodiment, the first indication message is further configured to indicate at least one piece of the following information: a codebook subset restriction information corresponding to the first signal; a quantity of transmission streams corresponding to the first signal; a precoding matrix information number corresponding to the first signal; or SRS resources corresponding to the first signal.

In one embodiment, the first indication message is further configured to indicate a quantity of transmission streams of the first signal and indicate the UE to send the first signal by adopting the quantity of the transmission streams indicated by the first indication message; or the first indication message is configured to indicate the UE to send the first signal by adopting a default quantity of transmission streams for the UE; or the first indication message is configured to indicate the UE to send the first signal by adopting a quantity of transmission streams pre-defined in a protocol.

In one embodiment, the first transmission mode is that the UE is configured to send the first signal by adopting a self-defined precoding matrix and using the quantity of the transmission streams; and the first power control policy is that: the UE is configured to send the first signal with first sending power.

In one embodiment, the first signal includes: a PUSCH or a PUCCH.

In one embodiment, the first power control policy and/or the first transmission mode include/includes: a power control policy that the UE is configured to send the first signal with full power; and/or a transmission mode that the UE is configured to send the first signal with full power.

Another embodiment of the present disclosure provides a UE, including: a transceiver, configured to receive a first indication message sent by a network device, and the first indication message is configured to indicate the UE to send a first signal by using a first power control policy and/or a first transmission mode; a memory, configured to store an instruction; and a processor, configured to read the instruction in the memory to: determine the power control policy and/or the transmission mode based on the first indication message; and the transceiver is further configured to send the first signal by using a first sending power based on the power control policy and/or the transmission mode.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, in response to the first field being the SRI field, the first field occupies at least two bits.

In one embodiment, the first field includes a plurality of states, and different states in the plurality of states indicate different first power control policies or first transmission modes.

In one embodiment, the plurality of states include at least one of the following: the first field comprises at least one state which indicates the UE not to perform full-power sending; the first field includes at least two states which indicate the different first power control policies; the first field includes at least one state which indicates codebook subset restriction information of the UE; the first field includes at least one state which indicates a quantity of transmission streams of the first signal; or the first field includes at least two states which indicate the first transmission mode.

In one embodiment, the first power control policy includes at least one of the following.

The UE is configured to uniformly allocate first sending power to antenna ports where the first signal has non-zero transmission of data, and the first sending power refers to sending power worked out by the UE according to an uplink power control formula.

The UE is configured to perform scaling on first sending power through a first scale factor and then uniformly allocate the first sending power to each antenna port sending the first signal; and the first scale factor is a ratio of a quantity of antenna ports where the first signal has non-zero transmission of data to a quantity of antenna ports contained in SRS resources indicated by scheduling information of the first signal.

In response to that each antenna port sending the first signal is available to reach largest output power supported by a power class of the UE, the UE is configured to uniformly allocate first sending power to antenna ports where the first signal has non-zero transmission of data; in response to that any one of antenna ports sending the first signal does not reach the largest output power supported by the power class of the UE, the UE is configured to perform scaling on the first sending power through a second scale factor, and then uniformly allocate the first sending power to the antenna ports where the first signal has non-zero transmission of data; and the second scale factor is a ratio of a quantity of the antenna ports where the first signal has non-zero transmission of data to a largest quantity of antenna ports contained in one SRS resource supported by the UE.

The UE is configured to perform scaling on first sending power through a third scale factor, and then uniformly allocate the first sending power to antenna ports where the first signal has non-zero transmission of data; and the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

The UE is configured to adopt a power control policy corresponding to a quantity of the antenna ports contained in SRS resources indicated by scheduling information of the first signal.

Or, the UE is configured to perform scaling on first sending power through a fourth scale factor, and then uniformly allocate the first sending power to each antenna port sending the first signal; and the fourth scale factor is a scale coefficient self-defined by the UE.

In one embodiment, the first transmission mode includes at least one of the following: the UE is configured to adopt CDD to send the first signal; the UE is configured to adopt different delays on different coherent transmission antenna groups; one antenna port sending the first signal of the UE corresponds to at least two antenna ports contained in SRS resources indicated by an SRI; or the UE is configured to transmit the first signal after precoding the first signal through a pre-defined precoding matrix.

In one embodiment, the first indication message is further configured to indicate at least one piece of the following information: a codebook subset restriction information corresponding to the first signal; a quantity of transmission streams corresponding to the first signal; a precoding matrix information number corresponding to the first signal; or SRS resources corresponding to the first signal.

In one embodiment, the method further includes: determining, by the UE, a codebook subset according to the codebook subset restriction information and sending, by the UE, the first signal based on the codebook subset in response to that the codebook subset restriction information indicated by the first indication message is detected by the UE; or sending, by the UE, the first signal based on the quantity of the transmission streams in response to that the quantity of the transmission streams indicated by the first indication message is detected by the UE; or; determining, by the UE, a precoding matrix based on the precoding matrix information number and sending, by the UE, the first signal after precoding the first signal based on the precoding matrix, in response to that the precoding matrix information number indicated by the first indication message is detected by the UE.

In one embodiment, the first indication message is further configured to indicate a quantity of transmission streams of the first signal and indicate the UE to send the first signal by adopting the quantity of the transmission streams indicated by the first indication message; or the first indication message is configured to indicate the UE to send the first signal by adopting a default quantity of transmission streams for the UE.

In one embodiment, the step that the first indication message is configured to further indicate the quantity of the transmission streams of the first signal and indicate the UE to send the first signal by adopting the quantity of the transmission streams indicated by the first indication message, includes: determining, by the UE, the precoding matrix corresponding to the quantity of the transmission streams in a self-defining mode based on the quantity of the transmission streams and sending, by the UE, the first signal based on the precoding matrix; or sending, by the UE, the first signal by adopting a default precoding matrix corresponding to the quantity of the transmission streams.

In one embodiment, the first signal includes: a PUSCH or a PUCCH.

One embodiment of the present disclosure provides a network device, including: a determining device, configured to determine a first indication message, and the first indication message is configured to indicate a UE to send a first signal by using a first power control policy and/or a first transmission mode; and a sending device, configured to send the first indication message to the UE.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, in response to the first field being the SRI field, the first field occupies at least two bits.

In one embodiment, the first field includes a plurality of states in which at least one state indicates the first power control policy and/or the first transmission mode to send the first signal.

In one embodiment, the plurality of states include at least one of the following: the first field includes at least one state which indicates the UE not to perform sending with full power; the first field includes at least two states which indicate different first power control policies; the first field includes at least one state which indicates codebook subset restriction information of the UE; the first field includes at least one state which indicates a quantity of transmission streams of the first signal; or the first field includes at least two states which indicate the first transmission mode.

In one embodiment, the first power control policy includes at least one of the following.

The UE is configured to uniformly allocate first sending power to antenna ports where the first signal has non-zero transmission of data, and the first sending power refers to sending power worked out by the UE according to an uplink power control formula.

The UE is configured to perform scaling on first sending power through a first scale factor and then uniformly allocate the first sending power to each antenna port sending the first signal; and the first scale factor is a ratio of a quantity of antenna ports where the first signal has non-zero transmission of data to a quantity of antenna ports contained in SRS resources indicated by scheduling information of the first signal.

In response to that each antenna port sending the first signal is available to reach largest output power supported by a power class of the UE, the UE is configured to uniformly allocate first sending power to antenna ports where the first signal has non-zero transmission of data; in response to that any one of antenna ports sending the first signal does not reach the largest output power supported by the power class of the UE, the UE is configured to perform scaling on the first sending power through a second scale factor, and then uniformly allocate the first sending power to the antenna ports where the first signal has non-zero transmission of data; and the second scale factor is a ratio of a quantity of the antenna ports where the first signal has non-zero transmission of data to a largest quantity of antenna ports contained in one SRS resource supported by the UE.

The UE is configured to perform scaling on first sending power through a third scale factor, and then uniformly allocate the first sending power to antenna ports where the first signal has non-zero transmission of data; and the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

The UE is configured to adopt a power control policy corresponding to a quantity of the antenna ports contained in SRS resources indicated by scheduling information of the first signal.

Or, the UE is configured to perform scaling on first sending power through a fourth scale factor, and then uniformly allocate the first sending power to each antenna port sending the first signal; and the fourth scale factor is a scale coefficient self-defined by the UE.

In one embodiment, the first transmission mode includes at least one of the following: the UE is configured to adopt CDD to send the first signal; the UE is configured to adopt different delays on different coherent transmission antenna groups; one antenna port sending the first signal of the UE corresponds to at least two antenna ports contained in SRS resources indicated by scheduling information of the first signal; or the UE is configured to transmit the first signal after precoding the first signal through a pre-defined precoding matrix.

In one embodiment, the first indication message is further configured to indicate at least one piece of the following information: a codebook subset restriction information corresponding to the first signal; a quantity of transmission streams corresponding to the first signal; a precoding matrix information number corresponding to the first signal; or SRS resources corresponding to the first signal.

In one embodiment, the first indication message is further configured to indicate a quantity of transmission streams of the first signal and indicate the UE to send the first signal by adopting the quantity of the transmission streams indicated by the first indication message; or the first indication message is configured to indicate the UE to send the first signal by adopting a default quantity of transmission streams for the UE; or the first indication message is configured to indicate the UE to send the first signal by adopting a quantity of transmission streams pre-defined in a protocol.

In one embodiment, the first signal includes: a PUSCH or a PUCCH.

In one embodiment, the first power control policy and/or the first transmission mode include/includes: a power control policy that the UE is configured to send the first signal with full power; and/or a transmission mode that the UE is configured to send the first signal with full power.

Another embodiment of the present disclosure provides a UE, including: a receiving device, configured to receive a first indication message sent by a network device, and the first indication message is configured to indicate the UE send a first signal by using a first power control policy and/or a first transmission mode; a determining device, configured to determine the first power control policy and/or the first transmission mode based on the first indication message; and a sending device, configured to send the first signal based on the first power control policy and/or the first transmission mode.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, in response to the first field being the SRI field, the first field occupies at least two bits.

In one embodiment, the first field includes a plurality of states in which at least one state indicates the first power control policy and/or the first transmission mode to send the first signal.

In one embodiment, the plurality of states include at least one of the following: the first field includes at least one state which indicates the UE not to perform sending with full power; the first field includes at least two states which indicate different first power control policies; the first field includes at least one state which indicates codebook subset restriction information of the UE; the first field includes at least one state which indicates the quantity of transmission streams of the first signal; or the first field includes at least two states which indicate the first transmission mode.

In one embodiment, the first power control policy includes at least one of the following.

The UE is configured to uniformly allocate first sending power to antenna ports where the first signal has non-zero transmission of data, and the first sending power refers to sending power worked out by the UE according to an uplink power control formula.

The UE is configured to perform scaling on first sending power through a first scale factor and then uniformly allocate the first sending power to each antenna port sending the first signal; and the first scale factor is a ratio of a quantity of antenna ports where the first signal has non-zero transmission of data to a quantity of antenna ports contained in SRS resources indicated by scheduling information of the first signal.

In response to that each antenna port sending the first signal is available to reach largest output power supported by a power class of the UE, the UE is configured to uniformly allocate first sending power to antenna ports where the first signal has non-zero transmission of data; in response to that any one of antenna ports sending the first signal does not reach the largest output power supported by the power class of the UE, the UE is configured to perform scaling on the first sending power through a second scale factor, and then uniformly allocate the first sending power to the antenna ports where the first signal has non-zero transmission of data; and the second scale factor is a ratio of a quantity of the antenna ports where the first signal has non-zero transmission of data to a largest quantity of antenna ports contained in one SRS resource supported by the UE.

The UE is configured to perform scaling on first sending power through a third scale factor, and then uniformly allocate the first sending power to antenna ports where the first signal has non-zero transmission of data; and the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

The UE is configured to adopt a power control policy corresponding to a quantity of the antenna ports contained in SRS resources indicated by scheduling information of the first signal.

Or, the UE is configured to perform scaling on first sending power through a fourth scale factor, and then uniformly allocate the first sending power to each antenna port sending the first signal; and the fourth scale factor is a scale coefficient self-defined by the UE.

In one embodiment, the first transmission mode includes at least one of the following: the UE is configured to adopt CDD to send the first signal; the UE is configured to adopt different delays on different coherent transmission antenna groups; one antenna port sending the first signal of the UE corresponds to at least two antenna ports contained in SRS resources indicated by an SRI; or the UE is configured to transmit the first signal after precoding the first signal through a pre-defined precoding matrix.

In one embodiment, the first indication message is further configured to indicate at least one piece of the following information: a codebook subset restriction information corresponding to the first signal; a quantity of transmission streams corresponding to the first signal; a precoding matrix information number corresponding to the first signal; or SRS resources corresponding to the first signal.

In one embodiment, the UE further includes: a detecting device, the detecting device is configured to detect the codebook subset restriction information indicated by the first indication message, determine a codebook subset according to the codebook subset restriction information and send the first signal based on the codebook subset; or the detecting device is configured to detect the quantity of the transmission streams indicated by the first indication message, and the UEs sends the first signal based on the quantity of the transmission streams; or the detecting device is configured to detect the precoding matrix information number indicated by the first indication message, and the UE determines a precoding matrix based on the precoding matrix information number and sends the first signal after precoding the first signal based on the precoding matrix.

In one embodiment, the first indication message is further configured to indicate a quantity of transmission streams of the first signal and indicate the UE to send the first signal by adopting the quantity of the transmission streams indicated by the first indication message; or the first indication message is further configured to indicate the UE to send the first signal by adopting a default quantity of transmission streams for the UE.

In one embodiment, the first indication message is further configured to indicate a quantity of transmission streams of the first signal and indicate the UE to send the first signal by adopting the quantity of the transmission streams indicated by the first indication message, the determining device is further configured to determine the precoding matrix corresponding to the quantity of the transmission streams in a self-defining mode based on the quantity of the transmission streams and send the first signal based on the precoding matrix; or an adopting device is configured to send the first signal by adopting a default precoding matrix corresponding to the quantity of the transmission streams.

In one embodiment, the first signal includes: a PUSCH or a PUCCH.

An embodiment of the present disclosure provides a computer storage medium, storing a computer program thereon, which causes a processor to implement any method provided by the embodiments when the computer program is executed by the processor.

By utilizing the signal transmission method, the network device and the UE provided by the present disclosure, the problem in the prior art in which the UE cannot be controlled to send uplink signals with full power can be solved.

BRIEF DESCRIPTION OF THE DRAWINGS

FIG. 4A is a precoding matrix for single-layer transmission using two antenna ports provided by an embodiment of the present application.

FIG. 4B is a precoding matrix for single-layer transmission using four antenna ports under a DFT-S-OFDM waveform provided by an embodiment of the present application.

FIG. 4C is a precoding matrix for single-layer transmission using four antenna ports under a CP-OFDM waveform provided by an embodiment of the present application.

FIG. 4D is a precoding matrix W for two-layer transmission using two antenna ports under a CP-OFDM waveform provided by an embodiment of the present application.

FIG. 4E is a precoding matrix W for two-layer transmission using four antenna ports under a CP-OFDM waveform provided by an embodiment of the present application.

FIG. 4F is a precoding matrix W for three-layer transmission using four antenna ports under a CP-OFDM waveform provided by an embodiment of the present application.

FIG. 4G is a precoding matrix W for four-layer transmission using four antenna ports under a CP-OFDM waveform provided by an embodiment of the present application.

DETAILED DESCRIPTION OF THE EMBODIMENTS

In embodiments of the present application, the described embodiments are only a part of the embodiments of the present application. Based on the embodiments in the present application, all other embodiments belong to the protection scope of the present application.

In order to better understand the above embodiments, the embodiments of the present application are described in detail below through the accompanying drawings and specific embodiments. It should be understood that the embodiments of the present application and specific features in the embodiments are a detailed description of the embodiments of the present application, rather than a limitation of the embodiments of the present application. Without conflict, the embodiments of the present application may be combined with each other.

The embodiments of the present application will be clearly and completely described below in conjunction with the accompanying drawings in the embodiments of the present application.

In the embodiments of the present application, a transmission stream is sometimes referred to as a layer, and the quantity of the streams is also referred to as the quantity of the layers.

The background art of the embodiments of the present application is introduced below.

A physical uplink shared channel (PUSCH) of a 3GPP NR system of an Release 15 version and an Release 16 version supports two uplink transmission solutions, namely codebook-based transmission and non-codebook transmission. The codebook-based uplink transmission solution is a multi-antenna transmission technology in which an uplink transmission precoding matrix is determined based on a fixed codebook.

Figures 1, 2:
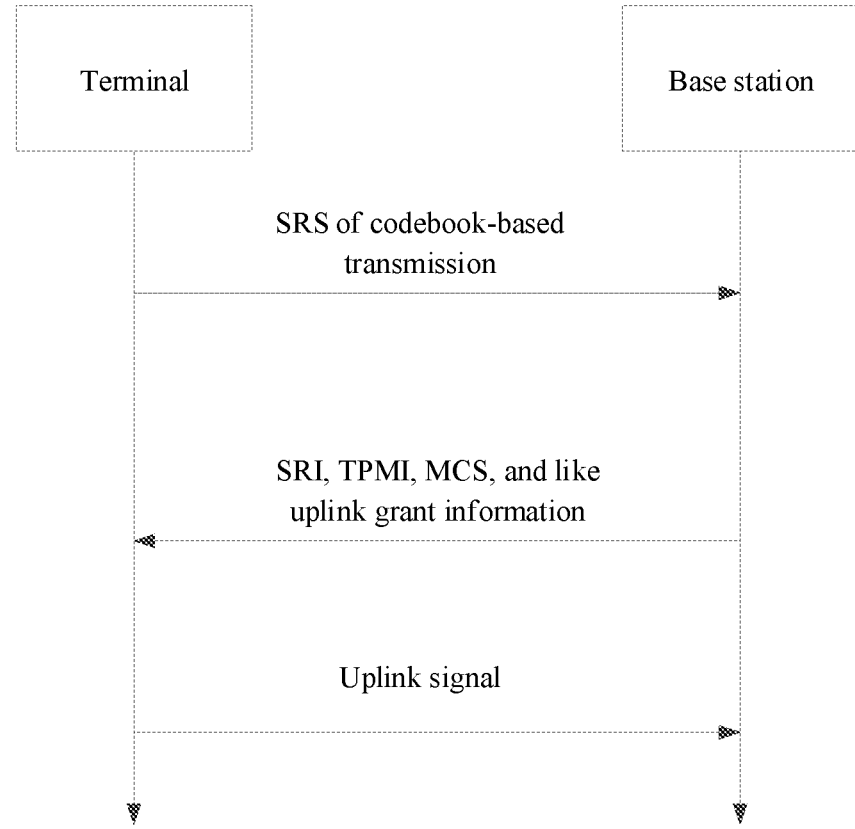
FIG. 1 is a schematic diagram of codebook-based uplink transmission provided by an embodiment of the present application.
FIG. 2 is a flow diagram of a signal transmission method provided by an embodiment of the present application.

In the NR system, as shown in FIG. 1, a flow of the codebook-based uplink transmission solution approximately is: UE sends a sounding reference signal (SRS) obtained by channel state information (CSI) for the codebook-based uplink transmission solution to a base station. The base station performs uplink channel detection according to the SRS sent by the UE, performs resource scheduling on the UE, and determines SRS resources corresponding to uplink transmission, the quantity of layers of uplink transmission and a precoding matrix. The base station further determines a modulation and coding scheme (MCS) of uplink transmission according to the precoding matrix and channel information, and then the base station notifies the UE of PUSCH resource allocation and corresponding MCSs, a transmit precoding matrix indicator (TPMI), the quantity of the transmission layers and a corresponding SRS resource indicator (SRI). The UE performs modulation and coding on data according to the MCS indicated by the base station, and determines a precoding matrix and the quantity of transmission layers used in the data transmission by using the indicated SRI, TPMI and quantity of the transmission layers, precoding and sending the data. A PUSCH demodulation pilot and PUSCH data adopt the same precoding manner. The base station performs uplink channel estimation according to a demodulation pilot signal and performs data detection.

For MIMO transmission of the UE, properties of a transmission antenna and radio frequency thereof have a large difference from the base station, so relevant properties between antennas need to be fully considered on codebook design. When two antenna ports meet a coherent condition, the UE may perform data transmission of the same layer at the same time by using the two antenna ports through precoding to obtain array gains. However, actual antenna ports of the UE inevitably have differences in power, phase and other aspects due to the influence of factors such as a mutual coupling effect of antenna array elements, feeder line differences as well as change of the phase and gains of an amplifier of a radio frequency access. Limited by the cost and design, not all UE can calibrate antenna ports to a degree meeting a coherent transmission requirement. For the UE which cannot achieve antenna coherent transmission, a phase difference between UE antennas when the TPMI is calculated and a phase difference between the antennas when the UE performs PUSCH transmission after receiving the TPMI may have a large difference value. If the TPMI indicates the antennas which cannot perform coherent transmission to be used for transmission of the same data layer, optimum uplink transmission precoding of the UE may not be precoding indicated by the TPMI, that is, the UE cannot obtain good performance when using the base station to perform PUSCH transmission through the precoding indicated by the TPMI.

Therefore, the base station may send codebook subset restriction signaling to the UE based on an antenna coherent transmission capability of the UE to restrict the UE from using part of codewords for uplink transmission. The NR system defines three antenna coherent transmission capabilities of the UE respectively: full-coherent, that is, all the antennas may be used for coherent transmission; partial-coherent, that is, antennas in the same coherent transmission group may be used for coherent transmission, and coherent transmission cannot be performed between coherent transmission groups, and each coherent transmission group contains two antennas; and non-coherent, that is, no antenna may be used for coherent transmission.

The antenna coherent transmission capabilities of the UE (or coherent capabilities becoming the antennas of the UE) are indicated by a pusch-TransCoherence parameter in a codebook subset type parameter supported by the UE, namely a UE capability parameter MIMO-Parameters Per Band (see 3GPP protocols TS38.306 and TS38.331). The pusch-TransCoherence is configured to define an uplink codebook subset type supported by the UE when the UE performs precoding on the PUSCH, and its value may be nonCoherent, partialNonCoherent or fullCoherent. When the value of pusch-TransCoherence is nonCoherent, the UE only supports a codebook subset of non-coherent transmission. Due to the fact that codewords in the codebook subset of non-coherent transmission are all of a non-coherent transmission type, it may be considered that the value of pusch-TransCoherence being nonCoherent corresponds to that all antennas of the UE cannot be used for coherent transmission (corresponding to that the antenna coherent transmission capability of the UE is non-coherent). When the value of pusch-TransCoherence is partialNonCoherent, the UE only supports the codebook subset of non-coherent transmission and a codebook subset of partial-coherent transmission. Due to the fact that codewords in the codebook subset of partial-coherent transmission are all of a partial-coherent transmission type, it may be considered that the value of pusch-TransCoherence being partialNonCoherent corresponds to that antennas in the same coherent transmission group of the UE may be used for coherent transmission (corresponding to that the antenna coherent transmission capability of the UE is partial-coherent). When the value of pusch-TransCoherence is fullCoherent, the UE supports the codebook subset of non-coherent transmission, the codebook subset of partial-coherent transmission and a codebook subset of full-coherent transmission, namely all codewords in codebooks. At the moment, it may be considered that the value of pusch-TransCoherence being fullCoherent corresponds to that all the antennas of the UE may be used for coherent transmission (corresponding to that the antenna coherent transmission capability of the UE is full-coherent).

In uplink codebook subset types supported by the UE when the UE performs precoding on the PUSCH, codewords of different transmission types have different restriction conditions. The codewords of the non-coherent transmission type meet the conditions that: each PUSCH layer only has one activated antenna port, that is, only one antenna port corresponds to a non-zero element. The codewords of partial-coherent transmission meet the conditions that: each PUSCH layer has two activated antenna ports at most, and at least one PUSCH has two activated antenna ports, that is, only two antenna ports correspond to elements being zero. The codewords of full-coherent transmission meet the conditions that: at least one PUSCH uses all the antenna ports. In other words, any column in the codewords of partial-coherent transmission only corresponds to non-zero elements belonging to the same coherent transmission antenna group (in the 3GPP NR system, a first antenna and a third antenna are a coherent transmission antenna group, and a second antenna and a fourth antenna are another coherent transmission antenna group); and any column in the codewords of non-coherent transmission only corresponds to non-zero elements of one antenna, and at least one column of elements in the codewords of full-coherent transmission is non-zero.

In the NR system, the UE has a specific power class (PC) capability, namely the requirement of the largest output power that the UE needs to meet. For example, for UE with a power class PC3, its largest output power needs to reach 23 dBm; and for UE with a power class PC2, its largest output power needs to reach 26 dBm. For UE with a plurality of power amplifiers (PA), it may use the plurality of PAs for sending at the same time to meet the requirement of the largest output power. That is, not every PA of the UE is required to reach the largest output power required by the power class of the UE. For example, for UE with two sending antennas (or two PAs), each of which being capable of reaching 20 dBm, the UE may use the two antennas for sending at the same time to reach 23 dBm, so this UE is the UE with the PC3.

To facilitate understanding, for example, it is assumed that four antenna ports are configured for uplink transmission, the precoding matrix indicated by the base station is as shown in formula (1), the UE sends the power worked out according to a PUSCH power control formula is P, and actual sending power of the PUSCH is P/2, and each of sending power of a first antenna port and sending power of a third antenna port is P/4. This scaling does not require every antenna port of the UE to reach the largest sending power, and the UE is allowed to use radio frequency elements with the lower cost to achieve a multi-antenna function.

$$\frac{1}{2}\begin{bmatrix} 1 \\ 0 \\ 1 \\ 0 \end{bmatrix} \quad (1)$$

From the perspective of UE performance, when the UE is located at an edge of a cell or a channel condition is poor, the base station usually configures transmission with a small quantity of transmission streams (or referred to as ranks) to the UE, and data are transmitted with the largest sending power as far as possible. Under codebook design of the NR system, for codebook-based uplink transmission, when the base station determines that the quantity of antenna ports contained in the SRS resources corresponding to uplink transmission is equal to the largest quantity of antenna ports contained in one SRS resource supported by the UE and the TPMI indicated by the base station is non-coherent or partial-coherent codewords, the UE cannot use a full-power sending capability to send uplink signals.

In the R16 version of the NR system, three full-power sending capabilities of the UE are defined, which are respectively: capability 1, each PA of the UE may reach largest power corresponding to the PC of the UE; capability 2, the UE supports full-power sending, but none of the PAs may reach the largest sending power corresponding to the PC of the UE; and capability 3, the UE supports full-power sending, and part of the PAs may reach the largest sending power corresponding to the PC of the UE.

Five policies of a UE using the full-power sending capabilities to send the uplink signals are further defined, which are respectively: policy 1, a new uplink codebook is introduced for the UE with the non-coherent transmission capability or the partial-coherent transmission capability; policy 2, the UE transparently uses cyclic delay diversity (CDD) or linear delay to send the uplink signals; policy 3, a power control rule of uplink MIMO of the UE is modified; policy 4, the UE self-defines how to realize full-power sending; and policy 5, the UE determines a scale coefficient of the sending power of the PUSCH corresponding to each precoding matrix in a self-defining mode, and guarantees that the same precoding matrix uses the same scale coefficient at different transmission occasions of the PUSCH.

The embodiments of the present application is introduced below in combination with the drawings of the description.

Referring to FIG. 2, an embodiment of the present application provides a signal transmission method, and the flow of the method is described as follows. Since the signal transmission method involves an interaction process between a UE and a network device, in the following description of the flow, processes executed by the UE and the network device are described together.

S201, a first indication message is determined, and the first indication message is configured to indicate the UE to use a first power control policy and/or a first transmission mode to send a first signal.

Under codebook design of an NR system, for codebook-based uplink transmission, UEs with a partial antenna coherent transmission capability and a non-coherent transmission capability always transmit the first signal based on the same MIMO power control policy during transmission, and the network device cannot, according to power capabilities of the UE, indicate a UE to send the first signal by adopting different power control policies and/or transmission modes under different channel states. Considering that, in the embodiment of the present application, the network device may determine the first indication message, and the first indication message indicates the UE to use a first power control policy and/or a first transmission mode to send the first signal, so that the UE may be indicated to adopt the different power control policies or the transmission modes to send the first signal according to different states in the first message. When the first indication message indicates the UE with the partial antenna coherent transmission capability and the non-coherent transmission capability to send the first signal with full power, the UE may use higher power to send the first signal, improving transmission performance of the UE.

In one embodiment, the first signal may be a physical uplink shared channel (PUSCH) or a physical uplink control channel (PUCCH).

In one embodiment, the UE sends an SRS of codebook-based uplink transmission to the network device, and the network device performs uplink channel detection according to the SRS sent by the UE and then determines the first indication message based on a result of the uplink channel detection.

For example, when the UE is located at an edge of a cell, the network device detects that the uplink channel has a poor state, the network device determines the first indication message which indicates the UE to send the first signal with full power, and based on the first indication message, sending power of the UE is increased by the UE, so that the UE has improved anti-interference performance and obtains the better performance.

For example, when the UE is located at a center of the cell, the network device detects that the uplink channel has a good state, the network device determines the first indication message which indicates the UE to send the first signal with non-full power, and based on the first indication message, the sending power of the UE is decreased by the UE, so that interference of the UE on other devices is lowered.

The first power control policy may include the following.

First, the UE is configured to uniformly allocate first sending power to antenna ports where the first signal has non-zero transmission of data. The first sending power may refer to sending power worked out by the UE according to an uplink power control formula. When the first signal is the PUSCH, the first sending power may be sending power of the PUSCH, such as: sending power of the PUSCH that has been defined in a protocol or that is newly defined in a subsequent protocol version. Alternatively, the sending power of the uplink channel may be sending power of the uplink channel worked out by the UE through a power calculating formula, and the power calculating formula may be a power calculating formula defined in the protocol. In the embodiment of the present application, the power calculating formula is not limited, and it may be a power calculating formula that has been defined in the protocol or a power calculating formula newly defined in the subsequent protocol version. For instance, in a protocol of a Rel-15 version of the NR system, the sending power of the uplink channel worked out through the power calculating formula may be power $P_{PUSCH,b,f,c}$ (i, j, $q_d$, l) worked out according to a formula in the section 7.1.1 of TS38.213.

To facilitate understanding, for example, it is assumed that four antenna ports are configured for uplink transmission, a precoding matrix W indicated by a base station is as shown in formula (2), the first sending power worked out by the UE according to an uplink power control formula is P, and if a first antenna port and a third antenna port are antenna ports which actually transmit the first signal, sending power of the first antenna port and the third antenna port is P/2, that is, the UE does not perform scaling on P and directly and uniformly allocates P to the first antenna port and the third antenna port.

If the first antenna port is the antenna port transmitting the first signal, the sending power of the first antenna port is P, that is, the UE does not perform scaling on P and directly and uniformly allocates P to the first antenna port.

$$w = \begin{bmatrix} 1 \\ 0 \\ 1 \\ 0 \end{bmatrix} \quad (2)$$

Second, the UE is configured to perform scaling on the first sending power through a first scale factor and then uniformly allocate the first sending power to each antenna port sending the first signal. The first scale factor is a ratio of the quantity of the antenna ports where the first signal has non-zero transmission of data to the quantity of the antenna ports contained in SRS resources indicated by scheduling information of the first signal.

To facilitate understanding, examples are taken for description. In the NR system, it is assumed that the quantity of antenna ports contained in SRS resources indicated by an SRI is 4, and two of the antenna ports configured for uplink transmission are configured to transmit the first signal, that is, the UE determines that the first scale factor is ½. The first sending power worked out by the UE according to the uplink power control formula is P. A multi-antenna allocation manner of the UE for uplink MIMO is: P is scaled based on the first scale factor, namely the scaled sending power is P/2, and then the scaled sending power P/2 is uniformly allocated to the two antenna ports configured to transmit the first signal, that is, the power of each antenna port transmitting the first signal is P/4.

Third, if each antenna port sending the first signal may reach largest output power supported by a power class of the UE, the UE is configured to uniformly allocate the first sending power to the antenna ports where the first signal has non-zero transmission of data; otherwise, the UE performing is configured to perform scaling on the first sending power through a second scale factor, and then the UE uniformly allocate the first sending power to the antenna ports where the first signal has non-zero transmission of data. The second scale factor is a ratio of the quantity of the antenna ports where the first signal has non-zero transmission of data to the largest quantity of the antenna ports contained in one SRS resource supported by the UE. The first sending power may refer to the sending power worked out by the UE according to the uplink power control formula. When the first signal is the PUSCH, the first sending power may be the sending power of the PUSCH, such as: the sending power of the PUSCH that has been defined in the protocol or that is newly defined in the subsequent protocol version. Alternatively, the sending power of the uplink channel may be the sending power of the uplink channel worked out by the UE through the power calculating formula, and the power calculating formula may be the power calculating formula defined in the protocol. In the embodiment of the present application, the power calculating formula is not limited, and it may be a power calculating formula that has been defined in the protocol or a power calculating formula newly defined in the subsequent protocol version. For instance, in the protocol of the Rel-15 version of the NR system, the sending power of the uplink channel worked out through the power calculating formula may be power $P_{PUSCH,b,f,c}(i, j, q_d, l)$ worked out according to a formula in the section 7.1.1 of TS38.213.

In the text of the present application, the largest sending power supported by the power class of the UE may refer to largest output power required by the protocol for the power class of the UE. For example, in the Rel-15 version of the NR system, for UE with the power class 3, the largest sending power is required (the required largest output power) to be the largest output power, which is 23 dBm.

In one embodiment, whether each antenna port configured to send the first signal may reach the largest sending power supported by the power class of the UE is divided into the following two cases.

Case 1, each antenna port configured to send the first signal may reach the largest sending power supported by the power class of the UE.

Case 2, one or more antenna ports that cannot reach the largest sending power supported by the power class of the UE exist in the antenna ports configured to send the first signal.

For case 1, the UE uniformly allocates the first sending power to the antenna ports where the first signal has non-zero transmission of data.

For case 2, after performing scaling on the first sending power through the second scale factor, the UE uniformly allocates the first sending power to the antenna ports where the first signal has non-zero transmission of data. The second scale factor is the ratio of the quantity of the antenna ports where the first signal has non-zero transmission of data to the largest quantity of the antenna ports contained in one SRS resource supported by the UE.

To facilitate understanding, description is exemplified below. It is assumed that the UE is configured with the four antenna ports for transmission, and the four antenna ports are the first antenna port, the second antenna port, the third antenna port and the fourth antenna port respectively. The first antenna port and the third antenna port are the antenna ports transmitting the first signal, the first sending power is P, and the largest quantity of the antenna ports contained in one SRS resource supported by the UE is 8. If the first antenna port is the port for sending with non-full power, the UE determines that the second scale factor is ¼, and then the first sending power is scaled based on the first scale factor to obtain scaled sending power which is P/4. Afterwards, the scaled sending power P/4 is uniformly allocated to the first antenna port and the third antenna port, that is, the sending power of the first antenna port and the third antenna port is P/8.

Fourth, the UE performing is configured to perform scaling on the first sending power through a third scale factor, and then the UE uniformly allocate the first sending power to each antenna port where the first signal has non-zero transmission of data. The third scale factor is a ratio of the quantity of the antenna ports where the first signal has non-zero transmission of data to the quantity of the antenna ports contained in the SRS resources indicated by the scheduling information of the first signal. The first sending power may refer to the sending power worked out by the UE according to the uplink power control formula. When the first signal is the PUSCH, the first sending power may be the sending power of the PUSCH, such as: the sending power of the PUSCH that has been defined in the protocol or that is newly defined in the subsequent protocol version. Alternatively, the sending power of the uplink channel may be the sending power of the uplink channel worked out by the UE through the power calculating formula, and the power calculating formula may be the power calculating formula defined in the protocol. In the embodiment of the present application, the power calculating formula is not limited, and it may be a power calculating formula that has been defined in the protocol or a power calculating formula newly defined in the subsequent protocol version. For instance, in the protocol of the Rel-15 version of the NR system, the sending power of the uplink channel worked out through the power calculating formula may be power $P_{PUSCH,b,f,c}(i, j, q_d, 1)$ worked out according to a formula in the section 7.1.1 of TS38.213.

To facilitate understanding, description is exemplified below. It is assumed that the UE is configured with the four antenna ports for transmission, and the four antenna ports are the first antenna port, the second antenna port, the third antenna port and the fourth antenna port respectively. The first antenna port and the third antenna port are the antenna ports transmitting the first signal, the first sending power is P, and the quantity of the antenna ports contained in the SRS resources indicated by the SRI is 6. If the first antenna port is the port for sending with non-full power, the UE determines that the third scale factor is ⅔, and then the first sending power is scaled based on the third scale factor to obtain scaled sending power which is 2P/3. Afterwards, the scaled sending power is uniformly allocated to the first antenna port and the third antenna port, that is, the sending power of the first antenna port and the third antenna port is P/3.

Fifth, the UE is configured to adopt a power control policy corresponding to the quantity of the antenna ports contained in the SRS resources indicated by the scheduling information of the first signal.

For example, the quantity of the antenna ports contained in the SRS resources indicated by the SRI and the power control policy have a preset relationship, it is assumed that the quantity of the antenna ports contained in the SRS resources indicated by the SRI is 4, and the corresponding power control policy is that "the UE is configured to uniformly allocate the first sending power to each antenna port where data transmission actually exists in the precoding matrix configured to send the first signal". When the quantity of the antenna ports contained in the SRS resources indicated by the SRI is 2, the corresponding power control policy is that "the UE is configured to perform scaling on the first sending power through the first scale factor, and then uniformly allocate the first sending power to each antenna port sending the first signal". The UE finds the corresponding power control policy based on the quantity of the antenna ports contained in the SRS resources indicated by the SRI and the preset relationship.

Sixth, the UE is configured to perform scaling on first sending power through a fourth scale factor, and then uniformly allocate the first sending power to each antenna port sending the first signal. The fourth scale factor is a scale coefficient self-defined by the UE. The first sending power refers to the sending power worked out by the UE according to the uplink power control formula.

Further, the first transmission mode may include the following.

First, the UE is configured to adopt CDD to transmit the first signal.

Second, the UE is configured to adopt different delays on different coherent transmission antenna ports.

For example, the UE is configured with the four antenna ports configured to transmit the first signal, and the four antenna ports are an antenna port 1, an antenna port 2, an antenna port 3 and an antenna port 4 respectively. The antenna port 1 and the antenna port 3 are non-coherent transmission ports, and the UE adopts a delay of 1 s on the antenna port 1 and adopts a delay of 2 s on the antenna port 3.

Third, one antenna port sending the first signal of the UE corresponds to at least two antenna ports contained in the SRS resources indicated by the scheduling information of the first signal.

The UE may determine analog beam forming according to the SRS resources indicated by the adopted SRI and then virtualize the port sending the first signal based on the analog beam forming, so that one antenna port sending the first signal of the UE is made to correspond to the at least two antenna ports contained in the SRS resources indicated by the SRI. In one embodiment, it includes at least the following two cases.

Figure 3A:
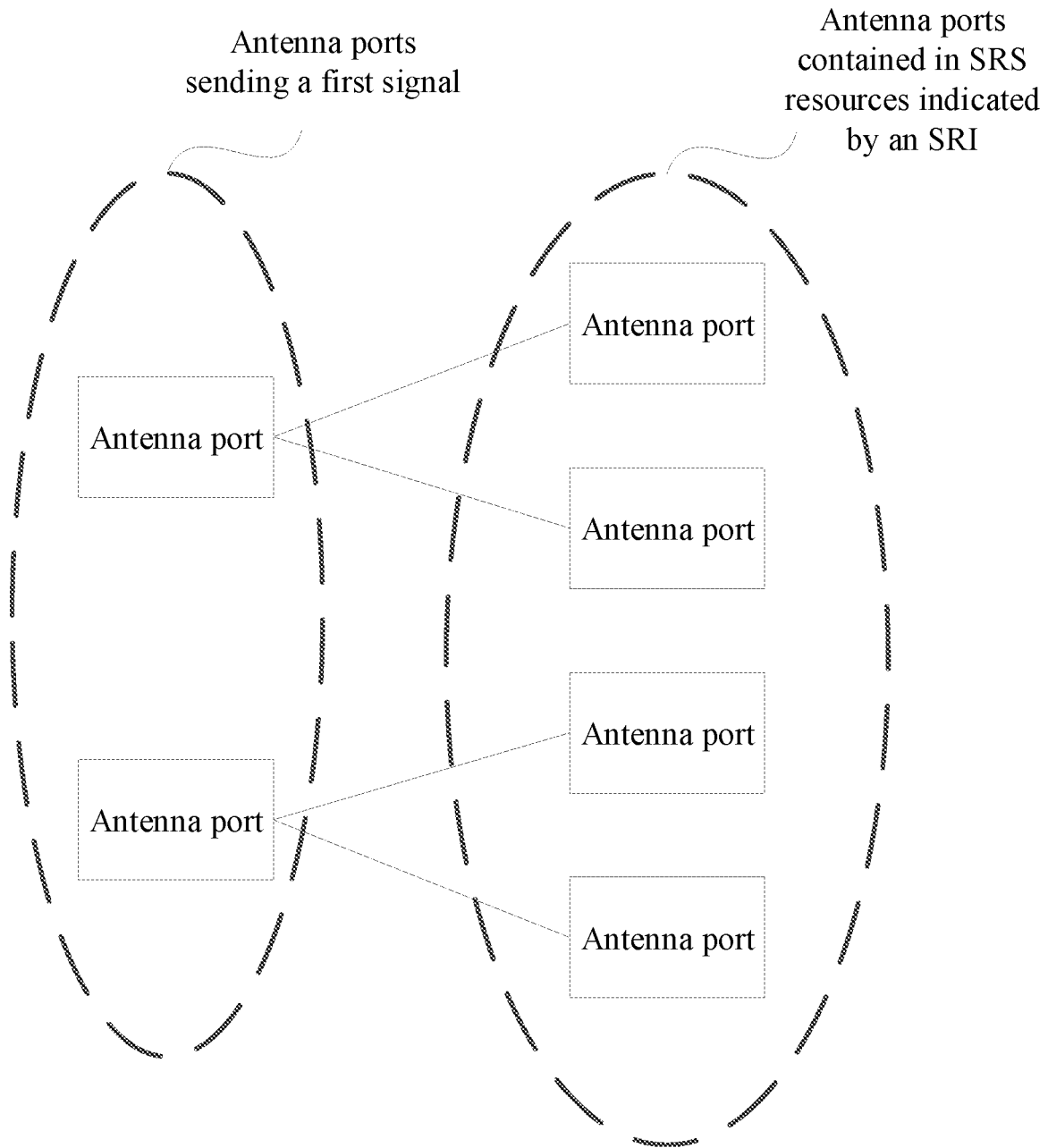
FIG. 3A is a schematic diagram of a correspondence between antenna ports sending a first signal and antenna ports contained in SRS resources indicated by an SRI provided by an embodiment of the present application.

Case 1, as shown in FIG. 3A, the UE adopts at least two antenna ports to send the first signal, and each port sending the first signal corresponds to at least two antenna ports contained in the SRS resources indicated by the SRI.

Figure 3B:
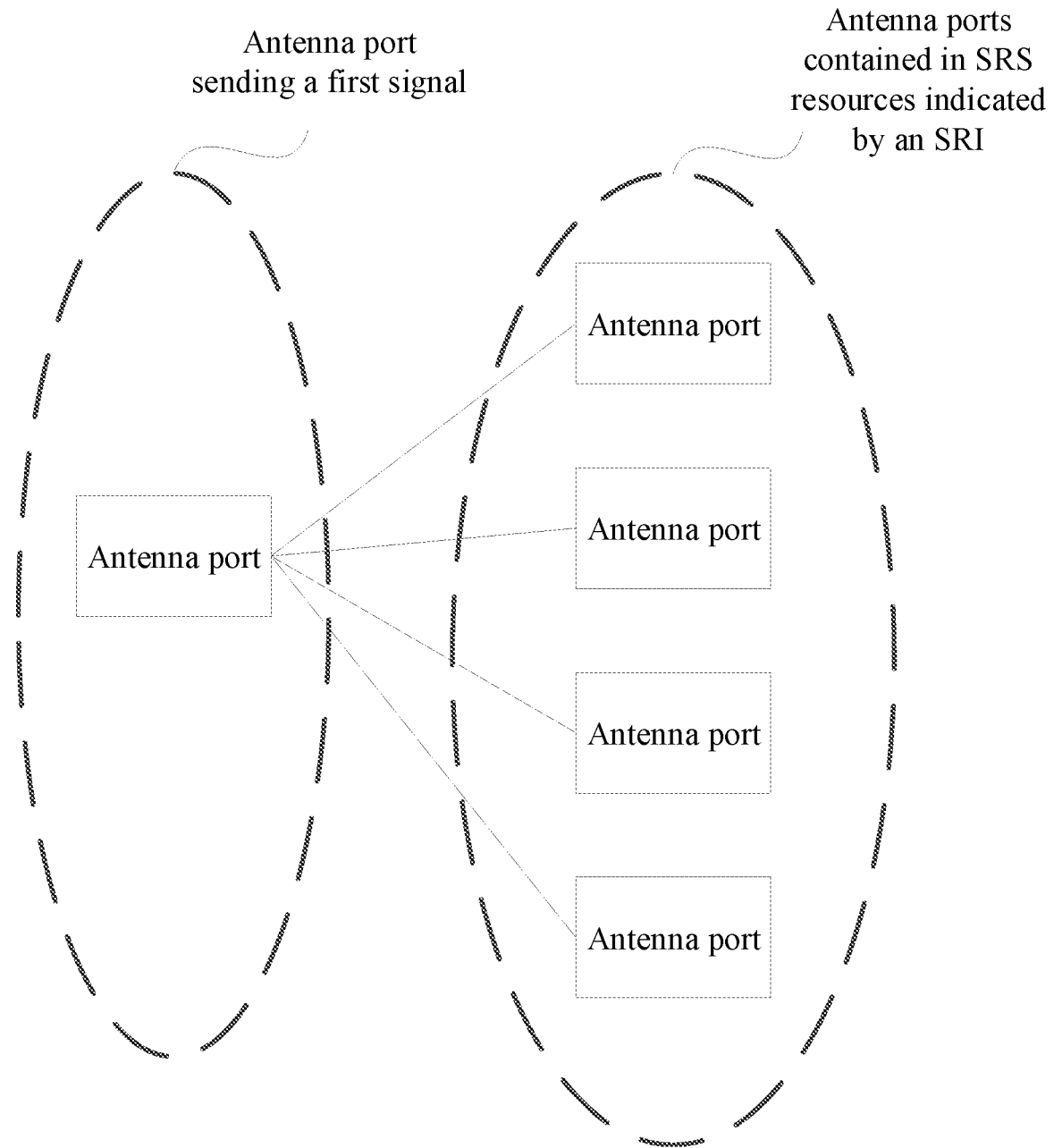
FIG. 3B is a schematic diagram of another correspondence between antenna ports sending a first signal and antenna ports contained in SRS resources indicated by an SRI provided by an embodiment of the present application.

Case 2, as shown in FIG. 3B, the UE adopts a single antenna port to send the first signal, and the single antenna port corresponds to all the antenna ports contained in the SRS resources indicated by the SRI.

Fourth, the UE is configured to transmit the first signal after precoding the first signal through a pre-defined precoding matrix.

In one embodiment, the pre-defined precoding matrix may be a precoding matrix agreed in the protocol, or a default precoding matrix of the UE, or a precoding matrix agreed by the UE and the network device.

S202, the first indication message is sent to the UE.

In one embodiment, the network device may send the first indication message to the UE through the following two manners.

Manner 1, the first indication message may be carried in high-level dynamic signaling RRC.

Manner 2, the first indication message may be carried in downlink control information (DCI).

In one embodiment, the first indication message being carried in the DCI further includes the following at least two manners.

First, the first indication message may be carried in a first field of the DCI.

In one embodiment, the DCI may include a plurality of fields. For example, the DCI may include a first field bearing the first indication message, a TPMI field, an SRI field and the like at the same time, or may also include one field. For example, the DCI may only include the first field and exclude the TPMI field, the SRI field and the like.

In a possible implementation, the first field includes a plurality of states in which at least one state indicates the first power control policy and/or the first transmission mode.

For example, the first field includes two bits and includes four states (e.g., a value of a state 0 is 00, a value of a state 1 is 01, a value of a state 2 is 10, and a value of a state 3 is 11), and the state 0 represents that the UE is configured to not perform scaling on the first sending power and directly and uniformly allocate the first sending power to each antenna port configured to transmit the first signal. The state 1 represents that after the UE is configured to perform scaling on the first sending power through the first scale factor, and then uniformly allocate the scaled sending power to each antenna port configured to transmit the first signal. The state 2 represents that the UE is configured to adopt the CDD to send the first signal. The state 3 represents that the UE is configured to adopt different delays on non-coherent antenna ports to send the first signal.

In one embodiment, the first indication message may be carried in the first field of the DCI. Some examples are as follows.

Case 1, the first field is a pre-defined field.

In one embodiment, the network device indicates the UE to send the uplink signal with full power through the pre-defined field of the DCI, and in a possible implementation, the plurality of states include the following states.

(1) The first field at least includes one state which indicates the UE not to perform full-power sending.

In one embodiment, after receiving the first indication message, if the UE detects that the first field includes the state which indicates the UE not to perform full-power sending, the UE determines the sending power of the first signal by using a power control policy of non-full-power sending. For example, when the first signal is the PUSCH, the UE determines the sending power of the PUSCH according to the following manners: the sending power of the PUSCH is worked out based on the uplink power control formula, a ratio of the quantity of the antenna ports actually performing non-zero signal sending to the largest quantity of the antenna ports contained in the SRS resources supported by the UE is determined, the worked out sending power of the PUSCH is scaled based on the ratio, and the scaled sending power is uniformly allocated to the antenna ports actually sending the signal.

(2) The first field at least includes two states which indicate different first power control policies.

In one embodiment, if the UE detects that the first field at least includes the two states which indicate the different first power control policies, for example, one state indicates the UE to use the first one of the first power control policies and the other state indicates the UE to use the second one of the first power control policies, the UE performs scaling on the worked out uplink sending power based on the power control policy indicated by each state, and then uniformly allocates the scaled sending power to the antenna ports actually sending the signal.

(3) The first field at least includes one state which indicates codebook subset restriction information of the UE.

In one embodiment, if the UE detects that the first field at least includes the one state which indicates the codebook subset restriction information of the UE, the UE determines a codebook subset of the uplink signal based on the codebook subset restriction information indicated by the at least one state and then transmits the uplink signal based on the codebook subset.

(4) The first field at least includes one state which indicates the quantity of transmission streams of the first signal.

In one embodiment, the UE detects that the first field at least includes the one state which indicates the quantity of the transmission streams of the first signal, determines the quantity of transmission streams of the uplink signal based on the quantity of the transmission streams indicated by the at least one state, and transmits the uplink signal based on the quantity of the transmission streams.

Further, the network device indicates the UE to send the uplink signal with full power through a precoding information and stream quantity field of the DCI.

(5) The first field at least includes two states which indicate the first transmission mode.

In one embodiment, if the UE detects that the first field at least includes the two states which indicate the first transmission mode, for example, one state indicates the UE to use the first one of the first transmission mode and the other state indicates the UE to use the second one of the first transmission mode, the UE transmits the uplink signal based on the transmission mode indicated by each state.

Case 2, the first field is a precoding information and stream quantity field.

In one embodiment, the network device indicates the UE to send the uplink signal with full power through the precoding information and stream quantity field of the DCI. The first indication message includes the following four states.

(1) The first indication message indicates the quantity of transmission streams corresponding to the first signal.

In one embodiment, detecting, by the UE, the quantity of the transmission streams corresponding to the first signal indicated by the first indication message further includes the following two manners.

Manner 1, the first indication message indicates the quantity of the transmission streams corresponding to the first signal and does not indicate a precoding information number.

In one embodiment, the UE detects that the first field indicates the first indication message which indicates the quantity of the transmission streams corresponding to the first signal and the transmission policy at the same time. The UE determines the precoding matrix according to the quantity of the transmission streams and then precodes the first signal based on the precoding matrix, and afterwards, the UE sends the precoded first signal according to the power control policy indicated by the first indication message. Determining, by the UE, the precoding matrix according to the quantity of the transmission streams of the first signal at least includes the following manners.

First, the UE adopts a default precoding matrix corresponding to the quantity of the transmission streams of the first signal.

In one embodiment, the default precoding matrix may be predetermined in the protocol, or a precoding matrix corresponding to the quantity of the transmission streams of the first signal determined by the UE based on a preset relationship between the quantity of the transmission streams and the default precoding matrix.

For example, during single-stream transmission of two antenna ports, the default precoding matrix is $[1\ 1]^T$, and during single-stream transmission of four antenna ports, the default precoding matrix is $[1\ 1\ 1]^T$.

Second, the UE selects a precoding matrix corresponding to the quantity of the transmission streams of the first signal in a self-defining mode according to the quantity of the transmission streams indicated by the first indication message.

In a possible implementation, the UE may select precoding matrices corresponding to all the antenna ports according to the quantity of the transmission streams indicated by the first indication message.

In a possible implementation, the UE determines the precoding matrix corresponding to the quantity of the transmission streams of the first signal according to a mapping relationship between the quantity of the transmission streams of the first signal and the precoding matrix.

In a possible implementation, the first indication message further indicates the UE not to perform scaling on the sending power of the first signal.

In a possible implementation, at least one of the plurality of states of the first field indicates the quantity of the transmission streams, the precoding matrix information number, and the power control policy and/or the transmission mode.

Manner 2, the first indication message indicates the quantity of the transmission streams corresponding to the first signal and meanwhile indicates the precoding information number.

For example, when the UE detects the power control policy indicated by the first indication message as well as the precoding matrix information number and the quantity of the transmission streams corresponding to the first signal, the UE determines the quantity of the transmission streams of the uplink signal based on the quantity of the transmission streams indicated by the first indication message, determines the precoding matrix corresponding to the first signal based on the precoding matrix information number, and transmits the first signal by adopting the precoding matrix and the quantity of the transmission streams and utilizing the power control policy indicated by the first indication message. FIGS. 4A-4G represent different precoding matrices in the NR system.

FIG. 4A represents a precoding matrix W for single-layer transmission using two antenna ports, and codewords with a TPMI index being 0-1 are codewords of non-coherent, and other codewords are codewords of full-coherent transmission.

FIG. 4B represents a precoding matrix W for single-layer transmission using four antenna ports with transform precoding enabled under a DFT-S-OFDM waveform. Codewords with the TPMI index being 0-3 are codewords of non-coherent transmission, codewords with the TPMI index being 4-11 are codewords of partial-coherent transmission, and other codewords are codewords of full-coherent transmission.

FIG. 4C represents a precoding matrix W for single-layer transmission using four antenna ports with transform precoding disabled under a CP-OFDM waveform. Codewords with the TPMI index being 0-3 are codewords of non-coherent transmission, codewords with the TPMI index being 4-11 are codewords of partial-coherent transmission, and other codewords are codewords of full-coherent transmission.

FIG. 4D represents a precoding matrix W for two-layer transmission using two antenna ports with transform precoding disabled under the CP-OFDM waveform. Codewords with the TPMI index being 0 are codewords of non-coherent transmission, and codewords with the TPMI index being 1-2 are codewords of full-coherent transmission.

FIG. 4E represents a precoding matrix W for two-layer transmission using four antenna ports with transform precoding disabled under the CP-OFDM waveform. Codewords with the TPMI index being 0-5 are codewords of non-coherent transmission, codewords with the TPMI index being 6-13 are codewords of partial-coherent transmission, and other codewords are codewords of full-coherent transmission.

FIG. 4F represents a precoding matrix W for three-layer transmission using four antenna ports with transform precoding disabled under the CP-OFDM waveform. Codewords with the TPMI index being 0 are codewords of non-coherent transmission, codewords with the TPMI index being 1-2 are codewords of partial-coherent transmission, and other codewords are codewords of full-coherent transmission.

FIG. 4G represents a precoding matrix W for four-layer transmission using four antenna ports with transform precoding disabled under the CP-OFDM waveform. Codewords with the TPMI index being 0 are codewords of non-coherent transmission, codewords with the TPMI index being 1-2 are codewords of partial-coherent transmission, and other codewords are codewords of full-coherent transmission.

(2) The first indication message indicates the precoding matrix information number corresponding to the first signal and does not indicate the quantity of the transmission streams.

In one embodiment, the first indication message indicates one power control policy and one precoding matrix information number at the same time, and the UE determines the precoding matrix of the uplink signal based on the pre-defined quantity of the transmission streams and according to the precoding matrix number, and transmits the uplink signal based on the precoding matrix. In one embodiment, the power control policy is that the UE does not perform scaling on the sending power of the uplink signal.

(3) The first indication message does not indicate the quantity of the transmission streams or the precoding matrix information number.

In a possible implementation, the first indication message only indicates the power control policy or the transmission mode used by the UE and does not indicate the quantity of the transmission streams or the precoding matrix information number of the UE.

In one embodiment, after receiving the first indication message, the UE detects that in the plurality of states corresponding to the first field, there is no state indicating the quantity of the transmission streams and the precoding matrix information number, and the UE sends the first signal by adopting the pre-defined power control policy or the pre-defined transmission mode.

In one embodiment, the transmission mode is that the UE sends the first signal based on a default quantity of transmission streams and by adopting the self-defined precoding matrix and using first power, and the first power is power worked out by the UE according to the power control formula of the first signal.

Determining, by the UE, the default quantity of the transmission streams through the following at least three manners.

Manner 1, the default quantity of the transmission streams is agreed by the UE and the network device. For example, the default quantity of the transmission streams is 1.

Manner 2, the default quantity of the transmission streams is self-defined by the UE. For example, the network device indicates the default quantity of the transmission streams to the UE, and the UE determines the default quantity of the transmission streams based on the indication of the network device.

Manner 3, the default quantity of the transmission streams is determined by the network device. For example, the UE sends indication information for the default quantity of the transmission streams to the network device, and the network device determines the default quantity of the transmission streams based on the indication of the UE.

Some examples using the precoding information and stream quantity field to indicate the first indication message are as follows.

(1) At least one state is added into the precoding information and stream quantity field, or at least one reserved state is used, and the state is configured to indicate the UE to send at full-power.

Taking an indication manner of the precoding information and stream quantity field during largest single-stream transmission of two antenna ports as an example, Table 1 below represents information indicated by a "precoding information and layer quantity" indication field when the largest rank quantity is 1 and the DFT-S-OFDM waveform or an OFDM waveform is used under the two antenna ports. When a codebook subset is limited as "nonCoherent", the state 2 corresponds to a full-power sending manner of the UE. In one embodiment, the full-power sending manner of the UE refers to that the UE performs single-stream PUSCH transmission by using the sending power worked out according to the PUSCH power control formula.

TABLE 1

| Bit field mapped to index | Codebook Subset = Fully And Partial And NonCoherent | Bit field mapped to index | Codebook Subset = NonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | 2 | Full power |
| 3 | 1 layer: TPMI = 3 | | |
| 4 | 1 layer: TPMI = 4 | | |
| 5 | 1 layer: TPMI = 5 | | |
| 6-7 | reserved | | |

(2) At least one state is added into the precoding information and stream quantity field, and the state is configured to indicate full-power sending and the quantity of the transmission streams of the UE.

Taking an indication manner of the precoding information and stream quantity field during largest two-stream transmission of two antenna ports of the PUSCH under the CP-OFDM waveform as an example, Table 2 below represents information indicated by the "precoding information and layer quantity" indication field when the largest rank quantity is 2 and the CP-OFDM waveform is used under the two antenna ports. When the codebook subset is limited as "nonCoherent", the state 3 corresponds to that full-power sending of the UE is indicated and the quantity of the transmission streams is 1; and when the codebook subset is limited as "nonCoherent", the state 4 corresponds to that full-power sending of the UE is indicated and the quantity of the transmission streams is 1. In one embodiment, the full-power sending manner of the UE refers to that the UE performs PUSCH transmission by using the sending power worked out according to the PUSCH power control formula. In the state 3, the UE performs single-stream PUSCH transmission with full power. In the state 4, the UE performs two-stream PUSCH transmission with full power.

TABLE 2

| Bit field mapped to index | Codebook Subset = Fully And Partial And NonCoherent | Bit field mapped to index | Codebook Subset = NonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | 1 layer |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

(3) At least one state is added into the precoding information and stream quantity field, or at least one reserved state is used, and the state is configured to indicate the UE to send at full-power, the precoding matrix and the quantity of the transmission streams.

Taking an indication manner of the precoding information and stream quantity field during largest two-stream transmission of two antenna ports of the PUSCH under the CP-OFDM waveform as an example, Table 3 below represents information indicated by the "precoding information and layer quantity" indication field when the largest rank quantity is 2 and the CP-OFDM waveform is used under the two antenna ports. When the codebook subset is limited as "nonCoherent", the states 3-5 correspond to that full-power sending of the UE is indicated. When the state 3 is indicated, the UE is indicated to send the PUSCH with full power under the condition that the quantity of the transmission streams is 1 and a precoding matrix TPMI is 0. The state 4 corresponds to that the UE is indicated to send the PUSCH with full power under the condition that the quantity of the transmission streams is 1 and the precoding matrix TPMI is 1. The state 5 corresponds to that the UE is indicated to send the PUSCH with full power under the condition that the quantity of the transmission streams is 2 and the precoding matrix TPMI is 0. In one embodiment, the full-power sending manner of the UE refers to that the UE transmits the PUSCH by using the manner that the sending power worked out according to the PUSCH power control formula is uniformly allocated to all the antenna ports where non-zero data transmission exists.

TABLE 3

| Bit field mapped to index | Codebook Subset = Fully And Partial And NonCoherent | Bit field mapped to index | Codebook Subset = NonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | 1 layer: TPMI = 0 |
| 4 | 1 layer: TPMI = 3 | 4 | 1 layer: TPMI = 1 |
| 5 | 1 layer: TPMI = 4 | 5 | 2 layers: TPMI = 0 |
| 6 | 1 layer: TPMI = 5 | | |
| 7 | 2 layers: TPMI = 1 | | |
| 8 | 2 layers: TPMI = 2 | | |
| 9-15 | reserved | | |

(4) At least one state is added into the precoding information and stream quantity field, or at least one reserved state is used, and the state is configured to indicate the UE to send at full-power, and the precoding matrix.

Taking an indication manner of the precoding information and stream quantity field during largest two-stream transmission of two antenna ports of the PUSCH under the CP-OFDM waveform as an example, Table 4 below represents information indicated by the "precoding information and layer quantity" indication field when the largest rank quantity is 2 and the CP-OFDM waveform is used under the two antenna ports. When the codebook subset is limited as "nonCoherent", the states 3-4 correspond to that full-power sending of the UE is indicated. When the state 3 is indicated, the UE is indicated to send the PUSCH with full power under the condition that the precoding matrix TPMI is 0. The state 4 corresponds to that the UE is indicated to send the PUSCH with full power under the condition that the precoding matrix TPMI is 1. In one embodiment, the full-power sending manner of the UE refers to that based on the single stream and the precoding matrix indicated by the precoding information and stream quantity field corresponding to the single stream, the UE transmits the PUSCH by using the manner that the sending power worked out according to the PUSCH power control formula is uniformly allocated to all the antenna ports where non-zero data transmission exists.

TABLE 4

| Bit field mapped to index | Codebook Subset = Fully And Partial And NonCoherent | Bit field mapped to index | Codebook Subset = NonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | TPMI = 0 |
| 4 | 1 layer: TPMI = 3 | 4 | TPMI = 1 |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

Case 3, the first field is the SRI field.

In one embodiment, the network device indicates the UE to use the power control policy and/or the transmission mode that the first signal is sent with full power through the SRI resource field in the DCI, and meanwhile, a state of the SRI field further indicates SRS resources corresponding to the first signal. After receiving the SRI field, the UE detects that the state of the SRI field indicates the UE to send the first signal with full power, determines the SRS resources corresponding to the first signal according to the state indication of the SRI field, and sends the first signal by using the power control policy and/or the transmission mode indicated by the SRI field on the basis of the determined SRS resources.

Case 4, the first field is a demodulation reference signal (DMRS) port indication field.

In the embodiment of the present application, the network device determines the first indication message which indicates the UE to use the first power control policy and/or the first transmission mode, and sends the first indication message to the UE. Therefore, the network device indicates the first power control policy and/or the first transmission mode which are/is used by the UE to send the first signal through the first indication message, avoiding the problem that the UE sends the first signal based on the same power control policy, resulting in that the network device cannot control the UE to send the uplink signal with full power.

The present application may be described through the following embodiments.

Embodiment 1

A special information field is introduced into DCI to indicate a UE to send an uplink signal with full power, and the information field contains one or more states to indicate the UE to send the uplink signal with full power. If the UE detects that the information field indicates the UE to send the uplink signal with full power, the UE sends the uplink signal by using a power control solution which indicates corresponding full-power sending of the uplink signal and/or a transmission manner for full-power sending of the uplink signal.

In one embodiment, the different states of the information field are configured to indicate different uplink signal sending behaviors.

In one embodiment, the information field contains at least one state which indicates the UE not to perform full-power sending. If the UE detects that the information field indicates the UE not to perform full-power sending, the UE determines sending power of the uplink signal by using an uplink power control solution for non-full-power sending. For example, when the uplink signal is a PUSCH, UE determines sending power of the PUSCH according to the following manners: sending power (in an NR system, corresponding to $P_{PUSCH,b,f,c}(i, j, q_d, l)$ in the section 7.1.1 of TS38.213-f40) of the PUSCH worked out according to an uplink power control formula is scaled according to a ratio of the quantity of ports actually performing non-zero signal sending to the largest quantity of SRS ports contained in one SRS resource supported by the UE, and then the scaled power is uniformly allocated to antenna ports actually sending the signal.

In one embodiment, the information field contains at least two states configured to indicate different uplink sending power control solutions. For example, one value of the information field indicates the UE to use a first uplink sending power control solution, and the other value indicates the UE to use a second uplink sending power control solution.

In one embodiment, the information field contains at least one state which indicates codebook subset restriction information of the UE. If the UE detects that the state of the information field indicates the codebook subset restriction of the UE, the UE determines a codebook subset of the uplink signal according to the information field. Under this solution, a base station may dynamically indicate codebook subset restriction to the UE.

In one embodiment, the information field contains one or more states configured to indicate the quantity of transmission streams of the uplink signal. If the information field indicates the quantity of the transmission streams of the uplink signal, the UE transmits the uplink signal by using the quantity of the transmission streams, that is, the quantity of the transmission streams of the uplink signal is the quantity of transmission streams.

In one embodiment, the information field contains at least two states configured to indicate an uplink transmission manner of full-power sending.

For example, the information field contains one bit, one state indicates the UE to send at full-power, and another state indicates the UE to send at non-full-power.

It should be understood that the present application does not exclude that one value of the information field indicates the uplink sending power control solution and the codebook subset restriction information at the same time.

In one embodiment, the information field and scheduling information such as a TPMI and an SRI of the uplink signal exist at the same time.

In one embodiment, the information field is an independent information field and may perform indication in the DCI without the TPMI and the SRI.

In one embodiment, the information field exists in the DCI only when the UE is a UE having a full-power sending capability and the quantity of antenna ports contained in SRS resources obtained by CSI for codebook-based uplink transmission is greater than 1; otherwise, the quantity of bits of the information field in the DCI is 0.

Embodiment 2

A base station indicates a UE to send an uplink signal with full power through a precoding information and layer quantity field in DCI. That is, one or more states of a precoding information and stream quantity field are configured to indicate the UE to send the uplink signal with full power. When the UE detects that the state of the precoding information and stream quantity field is a state indicating the UE to send the uplink signal with full power, the UE sends the uplink signal with full power.

In one embodiment, the different states of the precoding information and stream quantity field configured to indicate the UE to send the uplink signal with full power are configured to indicate different behaviors of sending the uplink signal with full power. That is, when the UE detects that the state of the precoding information and stream quantity field is the state indicating the UE to send the uplink signal with full power, the UE adopts the different behaviors of sending the uplink signal with full power for the different states.

In one embodiment, the state of the precoding information and stream quantity field configured to indicate the UE to send the uplink signal with full power does not contain an indicator of a TPMI index, and contains an indicator of the quantity of transmission streams. The UE determines the quantity of the transmission streams of the uplink signal according to indication information and sends the uplink signal with full power, and the quantity of the transmission streams of the uplink signal is the quantity of transmission streams determined by the UE according to the indication information. The UE determines the quantity of the transmission streams of the uplink signal as the indicator of the quantity of the transmission streams to indicate the quantity of the transmission streams. The base station detects and decodes the uplink signal based on the quantity of the transmission streams.

Here, the UE sends the uplink signal with full power, that is, the UE does not perform MIMO scaling on sending power of the uplink signal.

In one embodiment, none of PAs of the UE is capable of reaching largest sending power required by a PC of UE, so the UE sends the uplink signal by using the plurality of PAs through a manner of antenna virtualization.

In one embodiment, the UE uses a PA which is capable of reaching the largest sending power required by the PC of the UE to send the uplink signal.

In one embodiment, the UE selects a precoding matrix corresponding to the quantity of the transmission streams itself to send the uplink signal.

In one embodiment, the UE sends the uplink signal by using a default precoding matrix corresponding to the quantity of the transmission streams.

In one embodiment, the default precoding matrix is agreed in a protocol.

In one embodiment, the default precoding matrix is selected by the UE itself.

In one embodiment, a default precoding matrix during single-stream transmission of two antenna ports is $[1\ 1]^T$ (note: an amplitude coefficient of the precoding matrix is not considered here).

In one embodiment, a default precoding matrix during single-stream transmission of four antenna ports is $[1\ 1\ 1\ 1]^T$ (note: an amplitude coefficient of the precoding matrix is not considered here).

In one embodiment, the UE uses all antenna ports to send the uplink signal.

In one embodiment, the state of the precoding information and stream quantity field configured to indicate the UE to send the uplink signal with full power does not contain the indicator of the TPMI index and the indicator of the quantity of the transmission streams. The UE transmits the uplink signal by adopting a default quantity of transmission streams according to indication information, and the UE does not perform MIMO scaling on the sending power of the uplink signal. The base station detects and decodes the uplink signal based on the default quantity of the transmission streams.

In one embodiment, the default quantity of the transmission streams is 1.

In one embodiment, the default quantity of the transmission streams is determined by the UE. The UE sends indication information for the default quantity of the transmission streams to the base station. The base station determines the default quantity of streams according to the indication information of the UE.

In one embodiment, the default quantity of the transmission streams is indicated by the base station to the UE. The UE determines the default quantity of the transmission streams according to the information indicated by the base station.

In one embodiment, the UE uses the default precoding matrix to send the uplink signal.

In one embodiment, the default precoding matrix during single-stream transmission of the two antenna ports is $[1\ 1]^T$ (note: the amplitude coefficient of the precoding matrix is not considered here).

In one embodiment, the default precoding matrix during single-stream transmission of the four antenna ports is $[1\ 1\ 1\ 1]^T$ (note: the amplitude coefficient of the precoding matrix is not considered here).

In one embodiment, the UE sends the uplink signal by using a manner of small delay CDD.

In one embodiment, the UE sends the uplink signal by using a manner that a small delay is added to part of the antenna ports.

In one embodiment, the UE sends the uplink signal by using the plurality of PAs through the manner of antenna virtualization.

In one embodiment, the UE uses the PA which is capable of reaching the largest sending power required by the PC of the UE to send the uplink signal.

In one embodiment, PUSCH ports correspond to SRS ports in SRS resources indicated by an SRI one to one (note: an existing codebook-based transmission solution adopts one-to-one correspondence).

In one embodiment, the PUSCH ports do not correspond to the SRS ports in the SRS resources indicated by the SRI one to one.

In one embodiment, the UE determines analog beam forming by adopting the SRS resources indicated by the SRI.

In one embodiment, the UE performs PUSCH transmission of a single port.

One example is as shown in the following. It is assumed that the SRS ports indicated by the SRI contain four antenna ports, the UE may perform single-stream transmission at most, and a codebook subset indicated by the base station is a non-coherent codebook. When the precoding information and stream quantity field corresponds to index 4, the base station indicates the UE to perform full-power sending, the UE transmits the single-stream PUSCH, and the UE determines whether the PUSCH ports and the SRS ports have a relationship and have what relationship itself. In one embodiment, the UE performs single-port PUSCH transmission, for example, the UE transmits the PUSCH by adopting a manner similar to PUSCH transmission during DCI format 0_0 scheduling, and the PUSCH ports do not correspond to the SRS ports of the SRS resources indicated by the SRI one to one. This manner has the advantage that the UE may realize single-port PUSCH transmission without the need that the base station configures single-port SRS resources for the UE. In addition, indication information indicating the UE to perform full-power sending may also be sent using a reserved bit of the precoding information and stream quantity field. This solution may save the indication expenditure of the DCI.

In one embodiment, the state of the precoding information and stream quantity field configured to indicate the UE to send the uplink signal with full power contains the indicator of the TPMI index and the indicator of the quantity of the transmission streams. If the state of the precoding information and stream quantity field of the DCI is the state, configured to indicate the UE to send the uplink signal with full power, of the precoding information and stream quantity field, the UE determines the quantity of the transmission streams of the uplink signal and the precoding matrix according to the indication information and sends the uplink signal by using the power control solution of sending the uplink signal with full power, and the quantity of the transmission streams of the uplink signal is the quantity of the transmission streams indicated by the precoding information and stream quantity field, and the precoding matrix is a precoding matrix indicated by the precoding information and stream quantity field. The base station detects and decodes the uplink signal based on the quantity of the transmission streams.

In one embodiment, different indicators may correspond to different power control solutions of sending the uplink signal with full power.

In one embodiment, at least one state of the precoding information and stream quantity field configured to indicate the UE to send the uplink signal with full power contains a TPMI, and does not contain the indicator of the quantity of the transmission streams, and the precoding matrix indicated by the TPMI is a precoding matrix under a pre-defined quantity of streams. The UE determines the precoding matrix of the uplink signal according to the indication information, transmits the uplink signal by adopting the pre-defined quantity of the streams, and does not perform MIMO scaling on the sending power of the uplink signal. The base station detects and decodes the uplink signal based on the pre-defined quantity of the transmission streams.

The pre-defined quantity of the streams may be agreed by the base station and the UE in advance. For example, the pre-defined quantity of the streams may also be indicated by the base station to the UE, or reported by the UE to the base station.

Embodiment 3

A base station indicates a UE to send an uplink signal with full power through an SRI field in DCI. That is, one or more states of the SRI field are configured to indicate the UE to send the uplink signal with full power. When the UE detects that the state of the SRI field is a state indicating the UE to send the uplink signal with full power, the UE sends the uplink signal with full power.

To achieve the function, the quantity of bits of the SRI field may be extended, e.g., from 1 bit to 2 bits, and from 2 bits to 3 bits.

In one embodiment, indication information may also indicate SRS resources corresponding to the uplink signal, and the UE determines the SRS resources corresponding to the uplink signal according to the indication and sends the uplink signal by using an indicated power control rule of the uplink signal.

In one embodiment, the indication information may also indicate an uplink transmission manner for full-power sending, and the UE sends the uplink signal by using the indicated uplink transmission manner.

Figure 5:
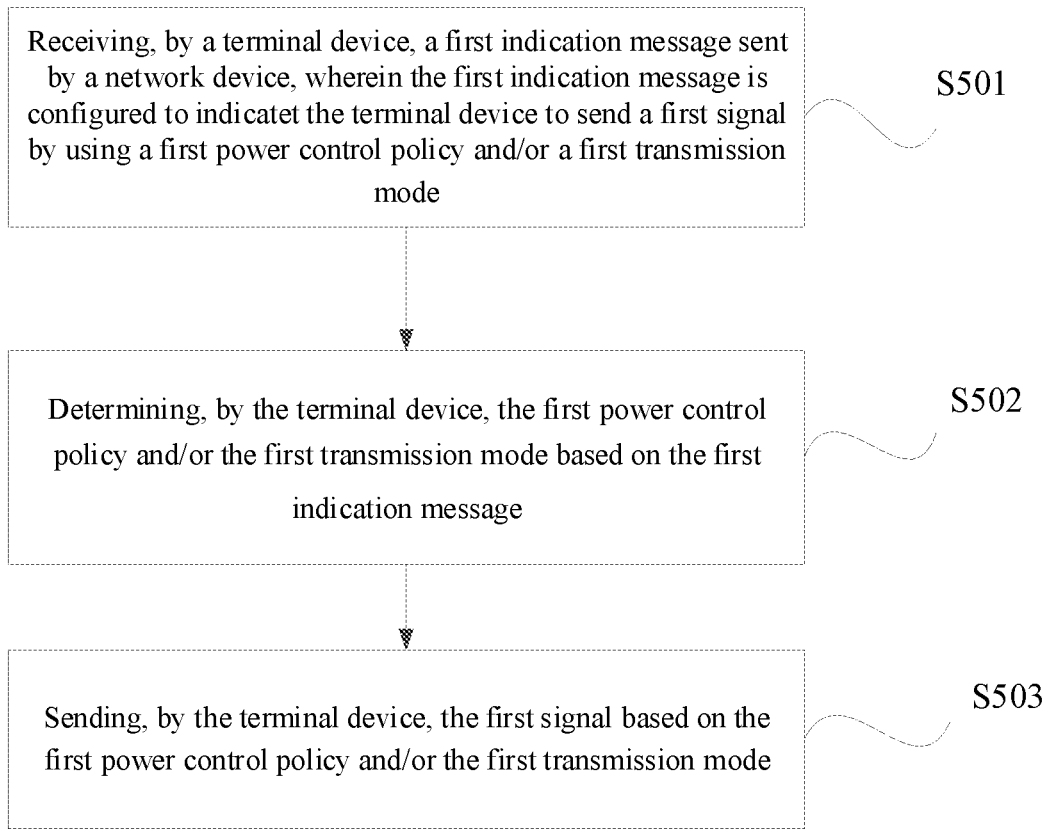
FIG. 5 is a flow diagram of a signal transmission method provided by an embodiment of the present application.

As shown in FIG. 5, the present application provides a signal transmission method, including the following.

S501, a UE receives a first indication message sent by a network device, and the first indication message indicates the UE to send a first signal by using a first power control policy and/or a first transmission mode.

S502, the UE determines the first power control policy and/or the first transmission mode based on the first indication message.

S503, the UE sends the first signal based on the first power control policy and/or the first transmission mode.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, if the first field is the SRI field, the first field occupies at least two bits.

In one embodiment, the first field includes a plurality of states in which at least one state indicates the first power control policy and/or the first transmission mode to send the first signal.

In one embodiment, the plurality of states include at least one of the following: the first field includes at least one state which indicates a UE not to perform full-power sending; the first field includes at least two states which indicate different first power control policies; the first field includes at least one state which indicates codebook subset restriction information of the UE; the first field includes at least one state which indicates the quantity of transmission streams of the first signal; or the first field includes at least two states which indicate the first transmission mode.

In one embodiment, the first power control policy includes at least one of the following policies.

The UE uniformly allocates first sending power to antenna ports where the first signal has non-zero transmission of data. The first sending power refers to sending power worked out by the UE according to an uplink power control formula.

The UE performs scaling on the first sending power through a first scale factor and then uniformly allocates the first sending power to each antenna port sending the first signal. The first scale factor is a ratio of the quantity of the antenna ports where the first signal has non-zero transmission of data to the quantity of antenna ports contained in SRS resources indicated by scheduling information of the first signal.

If each antenna port sending the first signal is capable of reaching largest output power supported by a power class of the UE, the UE uniformly allocates the first sending power to the antenna ports where the first signal has non-zero transmission of data; otherwise, after performing scaling on the first sending power through a second scale factor, the UE uniformly allocates the first sending power to the antenna ports where the first signal has non-zero transmission of data. The second scale factor is a ratio of the quantity of the antenna ports where the first signal has non-zero transmission of data to the largest quantity of the antenna ports contained in one SRS resource supported by the UE.

After performing scaling on the first sending power through a third scale factor, the UE uniformly allocates the first sending power to the antenna ports where the first signal has non-zero transmission of data. The third scale factor is a ratio of the quantity of the antenna ports where the first signal has non-zero transmission of data to the quantity of the antenna ports contained in the SRS resources indicated by the scheduling information of the first signal. The first sending power refers to the sending power worked out by the UE according to the uplink power control formula.

The UE will adopt a power control policy corresponding to the quantity of the antenna ports contained in the SRS resources indicated by the scheduling information of the first signal.

After performing scaling on the first sending power through a fourth scale factor, the UE uniformly allocates the first sending power to each antenna port sending the first signal. The fourth scale factor is a scale coefficient self-defined by the UE.

In one embodiment, the first transmission mode includes at least one of the following modes.

The UE adopts CDD to send the first signal.

The UE adopts different delays on different coherent transmission antenna groups.

One antenna port sending the first signal of the UE corresponds to at least two antenna ports contained in the SRS resources indicated by an SRI.

The UE transmits the first signal after precoding the first signal through a pre-defined precoding matrix.

In one embodiment, the first indication message further indicates at least one piece of the following information: the codebook subset restriction information corresponding to the first signal; the quantity of transmission streams corresponding to the first signal; a precoding matrix information number corresponding to the first signal; or the SRS resources corresponding to the first signal.

In one embodiment, the method further includes the following.

The UE detects the codebook subset restriction information indicated by the first indication message, determines a codebook subset according to the codebook subset restriction information and sends the first signal based on the codebook subset; or the UE detects the quantity of the transmission streams indicated by the first indication message and sends the first signal based on the quantity of the transmission streams; or the UE detects the precoding matrix information number indicated by the first indication message, determines a precoding matrix based on the precoding matrix information number and sends the first signal after precoding the first signal based on the precoding matrix.

In one embodiment, the first indication message further indicates the quantity of the transmission streams of the first signal and indicates the UE to send the first signal by adopting the quantity of the transmission streams indicated by the first indication message; or the first indication message further indicates the UE to send the first signal by adopting a default quantity of transmission streams for the UE.

In one embodiment, the step that the first indication message further indicates the quantity of the transmission streams of the first signal and indicates the UE to send the first signal by adopting the quantity of the transmission streams indicated by the first indication message includes: the UE determines the precoding matrix corresponding to the quantity of the transmission streams in a self-defining mode based on the quantity of the transmission streams and sends the first signal based on the precoding matrix; or the UE sends the first signal by adopting a default precoding matrix corresponding to the quantity of the transmission streams.

In one embodiment, the first signal includes: a PUSCH or a PUCCH.

Figure 6:
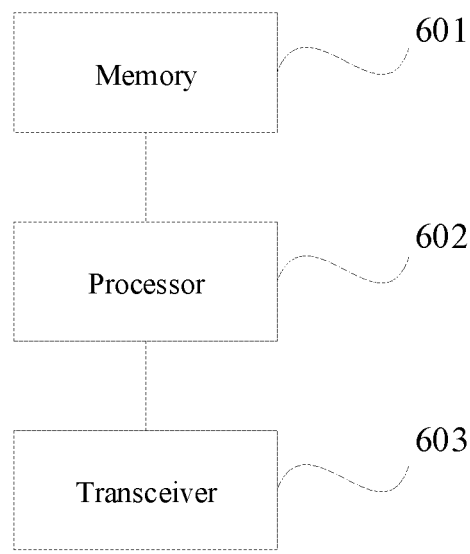
FIG. 6 is a schematic structural diagram of a network device provided by an embodiment of the present application.

Referring to FIG. 6, the present application provides a network device, including: a memory 601, configured to store an instruction; a processor 602, configured to read the instruction in the memory to: determine a first indication message, and the first indication message indicates a UE to send a first signal by using a first power control policy and/or a first transmission mode; and a transceiver 603, configured to send the first indication message to the UE.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, if the first field is the SRI field, the first field occupies at least two bits.

In one embodiment, the first field includes a plurality of states in which at least one state indicates the first power control policy and/or the first transmission mode to send the first signal.

In one embodiment, the plurality of states include at least one of the following: the first field includes at least one state which indicates a UE not to perform sending with full power; the first field includes at least two states which indicate different first power control policies; the first field includes at least one state which indicates codebook subset restriction information of the UE; the first field includes at least one state which indicates the quantity of transmission streams of the first signal; or the first field includes at least two states which indicate the first transmission mode.

In one embodiment, the first power control policy includes at least one of the following policies.

The UE uniformly allocates first sending power to antenna ports where the first signal has non-zero transmission of data. The first sending power refers to sending power worked out by the UE according to an uplink power control formula.

The UE performs scaling on the first sending power through a first scale factor and then uniformly allocates the first sending power to each antenna port sending the first signal. The first scale factor is a ratio of the quantity of the antenna ports where the first signal has non-zero transmission of data to the quantity of antenna ports contained in SRS resources indicated by scheduling information of the first signal.

If each antenna port sending the first signal is capable of reaching largest output power supported by a power class of the UE, the UE uniformly allocates the first sending power to the antenna ports where the first signal has non-zero transmission of data; otherwise, after performing scaling on the first sending power through a second scale factor, the UE uniformly allocates the first sending power to the antenna ports where the first signal has non-zero transmission of data. The second scale factor is a ratio of the quantity of the antenna ports where the first signal has non-zero transmission of data to the largest quantity of the antenna ports contained in one SRS resource supported by the UE.

After performing scaling on the first sending power through a third scale factor, the UE uniformly allocates the first sending power to the antenna ports where the first signal has non-zero transmission of data. The third scale factor is a ratio of the quantity of the antenna ports where the first signal has non-zero transmission of data to the quantity of the antenna ports contained in the SRS resources indicated by the scheduling information of the first signal. The first sending power refers to the sending power worked out by the UE according to the uplink power control formula.

The UE adopts a power control policy corresponding to the quantity of the antenna ports contained in the SRS resources indicated by the scheduling information of the first signal.

After performing scaling on the first sending power through a fourth scale factor, the UE uniformly allocates the first sending power to each antenna port sending the first signal. The fourth scale factor is a scale coefficient self-defined by the UE.

In one embodiment, the first transmission mode includes at least one of the following modes: the UE adopts CDD to send the first signal; the UE adopts different delays on different coherent transmission antenna groups; one antenna port sending the first signal of the UE corresponds to at least two antenna ports contained in the SRS resources indicated by the scheduling information of the first signal; or the UE transmits the first signal after precoding the first signal through a pre-defined precoding matrix.

In one embodiment, the first indication message further indicates at least one piece of the following information: the codebook subset restriction information corresponding to the first signal; the quantity of transmission streams corresponding to the first signal; a precoding matrix information number corresponding to the first signal; or the SRS resources corresponding to the first signal.

In one embodiment, the first indication message further indicates the quantity of the transmission streams of the first signal and indicates the UE to send the first signal by adopting the quantity of the transmission streams indicated by the first indication message; or the first indication message indicates the UE to send the first signal by adopting a default quantity of transmission streams for the UE; or the first indication message indicates the UE to send the first signal by adopting the quantity of transmission streams pre-defined in a protocol.

In one embodiment, the first signal includes: a PUSCH or a PUCCH.

In one embodiment, the first power control policy and/or the first transmission mode include/includes: a power control policy that the UE sends the first signal with full power; and/or a transmission mode that the UE sends the first signal with full power.

Figure 7:
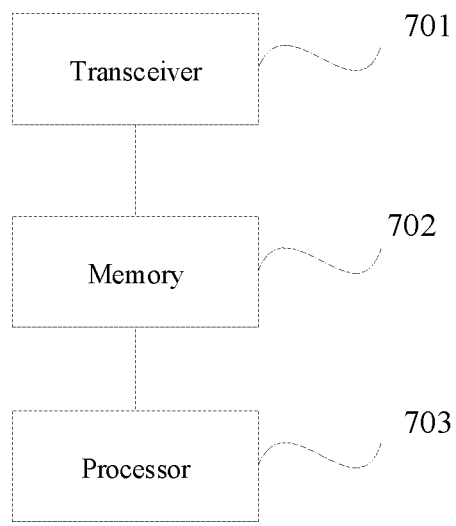
FIG. 7 is a schematic structural diagram of a UE provided by an embodiment of the present application.

Referring to FIG. 7, the present application provides a UE, including: a transceiver 701, configured to receive a first indication message sent by a network device, and the first indication message indicates the UE to send a first signal by using a first power control policy and/or a first transmission mode; a memory 702, configured to store an instruction; and a processor 703, configured to read the instruction in the memory to: determine a power control policy and/or a transmission mode corresponding to sending the first signal with first sending power based on the first indication message.

The transceiver 701 is further configured to send the first signal by using the first sending power based on the power control policy and/or the transmission mode.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, if the first field is the SRI field, the first field occupies at least two bits.

In one embodiment, the first field includes a plurality of states in which at least one state indicates the first power control policy and/or the first transmission mode to send the first signal.

In one embodiment, the plurality of states include at least one of the following: the first field includes at least one state which indicates a UE not to perform sending with full power; the first field includes at least two states which indicate different first power control policies; the first field includes at least one state which indicates codebook subset restriction information of the UE; the first field includes at least one state which indicates the quantity of transmission streams of the first signal; or the first field includes at least two states which indicate the first transmission mode.

In one embodiment, the first power control policy includes at least one of the following policies.

The UE uniformly allocates first sending power to antenna ports where the first signal has non-zero transmission of data. The first sending power refers to sending power worked out by the UE according to an uplink power control formula.

The UE performs scaling on the first sending power through a first scale factor and then uniformly allocates the first sending power to each antenna port sending the first signal. The first scale factor is a ratio of the quantity of the antenna ports where the first signal has non-zero transmission of data to the quantity of antenna ports contained in SRS resources indicated by scheduling information of the first signal.

If each antenna port sending the first signal is capable of reaching largest output power supported by a power class of the UE, the UE uniformly allocates the first sending power to the antenna ports where the first signal has non-zero transmission of data; otherwise, after performing scaling on the first sending power through a second scale factor, the UE uniformly allocates the first sending power to the antenna ports where the first signal has non-zero transmission of data. The second scale factor is a ratio of the quantity of the antenna ports where the first signal has non-zero transmission of data to the largest quantity of the antenna ports contained in one SRS resource supported by the UE.

After performing scaling on the first sending power through a third scale factor, the UE uniformly allocates the first sending power to the antenna ports where the first signal has non-zero transmission of data. The third scale factor is a ratio of the quantity of the antenna ports where the first signal has non-zero transmission of data to the quantity of the antenna ports contained in the SRS resources indicated by the scheduling information of the first signal. The first sending power refers to the sending power worked out by the UE according to the uplink power control formula.

The UE will adopt a power control policy corresponding to the quantity of the antenna ports contained in the SRS resources indicated by the scheduling information of the first signal.

After performing scaling on the first sending power through a fourth scale factor, the UE uniformly allocates the first sending power to each antenna port sending the first signal. The fourth scale factor is a scale coefficient self-defined by the UE.

In one embodiment, the first transmission mode includes at least one of the following modes.

The UE adopts CDD to send the first signal.

The UE adopts different delays on different coherent transmission antenna groups.

One antenna port sending the first signal of the UE corresponds to at least two antenna ports contained in the SRS resources indicated by the SRI.

The UE transmits the first signal after precoding the first signal through a pre-defined precoding matrix.

In one embodiment, the first indication message further indicates at least one piece of the following information: the codebook subset restriction information corresponding to the first signal; the quantity of transmission streams corresponding to the first signal; a precoding matrix information number corresponding to the first signal; or the SRS resources corresponding to the first signal.

In one embodiment, the method further includes the following.

The UE detects the codebook subset restriction information indicated by the first indication message, determines a codebook subset according to the codebook subset restriction information and sends the first signal based on the codebook subset; or the UE detects the quantity of the transmission streams indicated by the first indication message and sends the first signal based on the quantity of the transmission streams; or the UE detects the precoding matrix information number indicated by the first indication message, determines a precoding matrix based on the precoding matrix information number and sends the first signal after precoding the first signal based on the precoding matrix.

In one embodiment, the first indication message further indicates the quantity of the transmission streams of the first signal and indicates the UE to send the first signal by using the quantity of the transmission streams indicated by the first indication message; or the first indication message further indicates the UE to send the first signal by using a default quantity of transmission streams for the UE.

In one embodiment, the step that the first indication message further indicates the quantity of the transmission streams of the first signal and indicates the UE to send the first signal by using the quantity of the transmission streams indicated by the first indication message, includes: the UE determines the precoding matrix corresponding to the quantity of the transmission streams in a self-defining mode based on the quantity of the transmission streams and sends the first signal based on the precoding matrix; or the UE sends the first signal by using a default precoding matrix corresponding to the quantity of the transmission streams.

In one embodiment, the first signal includes: a PUSCH or a PUCCH.

Figure 8:
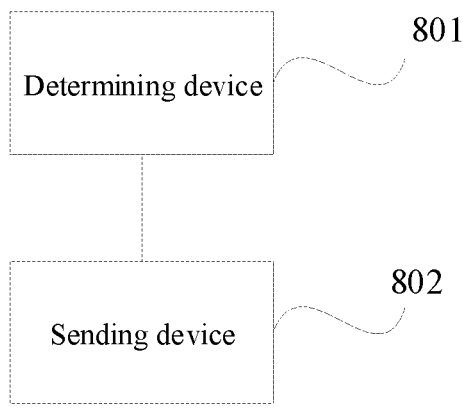
FIG. 8 is a schematic structural diagram of another network device provided by an embodiment of the present application.

Referring to FIG. 8, the present application provides a network device, including: a determining device 801, configured to determine a first indication message, and the first indication message indicates a UE to send a first signal by using a first power control policy and/or a first transmission mode; and a sending device 802, configured to send the first indication message to the UE.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, if the first field is the SRI field, the first field occupies at least two bits.

In one embodiment, the first field includes a plurality of states in which at least one state indicates the first power control policy and/or the first transmission mode to send the first signal.

In one embodiment, the plurality of states include at least one of the following: the first field includes at least one state which indicates a UE not to perform full-power sending; the first field includes at least two states which indicate different first power control policies; the first field includes at least one state which indicates codebook subset restriction information of the UE; the first field includes at least one state which indicates the quantity of transmission streams of the first signal; or the first field includes at least two states which indicate the first transmission mode.

In one embodiment, the first power control policy includes at least one of the following policies.

The UE uniformly allocates first sending power to antenna ports where the first signal has non-zero transmission of data. The first sending power refers to sending power worked out by the UE according to an uplink power control formula.

The UE performs scaling on the first sending power through a first scale factor and then uniformly allocates the first sending power to each antenna port sending the first signal. The first scale factor is a ratio of the quantity of the antenna ports where the first signal has non-zero transmission of data to the quantity of antenna ports contained in SRS resources indicated by scheduling information of the first signal.

If each antenna port sending the first signal is capable of reaching largest output power supported by a power class of the UE, the UE uniformly allocates the first sending power to the antenna ports where the first signal has non-zero transmission of data; otherwise, after performing scaling on the first sending power through a second scale factor, the UE uniformly allocates the first sending power to the antenna ports where the first signal has non-zero transmission of data. The second scale factor is a ratio of the quantity of the antenna ports where the first signal has non-zero transmission of data to the largest quantity of the antenna ports contained in one SRS resource supported by the UE.

After performing scaling on the first sending power through a third scale factor, the UE uniformly allocates the first sending power to the antenna ports where the first signal has non-zero transmission of data. The third scale factor is a ratio of the quantity of the antenna ports where the first signal has non-zero transmission of data to the quantity of the antenna ports contained in the SRS resources indicated by the scheduling information of the first signal. The first sending power refers to the sending power worked out by the UE according to the uplink power control formula.

The UE uses a power control policy corresponding to the quantity of the antenna ports contained in the SRS resources indicated by the scheduling information of the first signal.

After performing scaling on the first sending power through a fourth scale factor, the UE uniformly allocates the first sending power to each antenna port sending the first signal. The fourth scale factor is a scale coefficient self-defined by the UE.

In one embodiment, the first transmission mode includes at least one of the following modes.

The UE uses CDD to send the first signal.

The UE adopts different delays on different coherent transmission antenna groups.

One antenna port sending the first signal of the UE corresponds to at least two antenna ports contained in the SRS resources indicated by the scheduling information of the first signal.

The UE transmits the first signal after precoding the first signal through a pre-defined precoding matrix.

In one embodiment, the first indication message further indicates at least one piece of the following information: the codebook subset restriction information corresponding to the first signal; the quantity of transmission streams corresponding to the first signal; a precoding matrix information number corresponding to the first signal; or the SRS resources corresponding to the first signal.

In one embodiment, the first indication message further indicates the quantity of the transmission streams of the first signal and indicates the UE to send the first signal by using the quantity of the transmission streams indicated by the first indication message; or the first indication message indicates the UE to send the first signal by using a default quantity of transmission streams for the UE; or the first indication message indicates the UE to send the first signal by using the quantity of transmission streams pre-defined in a protocol.

In one embodiment, the first signal includes: a PUSCH or a PUCCH.

In one embodiment, the first power control policy and/or the first transmission mode include/includes: a power control policy that the UE sends the first signal with full power; and/or a transmission mode that the UE sends the first signal with full power.

Figure 9:
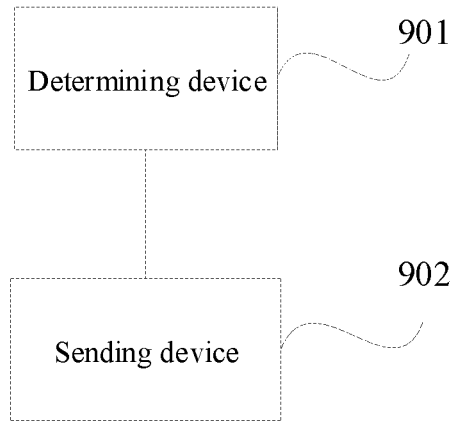
FIG. 9 is a schematic structural diagram of another UE provided by an embodiment of the present application.

Referring to FIG. 9, the present application provides a UE, including: a determining device 901, configured to determine a first power control policy and/or a first transmission mode based on a first indication message; and a sending device 902, configured to send a first signal based on the first power control policy and/or the first transmission mode.

In one embodiment, the first indication message is carried in a first field of DCI.

In one embodiment, the first field is a pre-defined field, or a precoding information and stream quantity field, or an SRI field, or a DMRS port indication field of the DCI.

In one embodiment, if the first field is the SRI field, the first field occupies at least two bits.

In one embodiment, the first field includes a plurality of states in which at least one state indicates the first power control policy and/or the first transmission mode to send the first signal.

In one embodiment, the plurality of states include at least one of the following: the first field includes at least one state which indicates a UE not to perform full-power sending; the first field includes at least two states which indicate different first power control policies; the first field includes at least one state which indicates codebook subset restriction information of the UE; the first field includes at least one state which indicates the quantity of transmission streams of the first signal; or the first field includes at least two states which indicate the first transmission mode.

In one embodiment, the first power control policy includes at least one of the following policies.

The UE uniformly allocates first sending power to antenna ports where the first signal has non-zero transmission of data. The first sending power refers to sending power worked out by the UE according to an uplink power control formula.

The UE performs scaling on the first sending power through a first scale factor and then uniformly allocates the first sending power to each antenna port sending the first signal. The first scale factor is a ratio of the quantity of the antenna ports where the first signal has non-zero transmission of data to the quantity of antenna ports contained in SRS resources indicated by scheduling information of the first signal.

If each antenna port sending the first signal is capable of reaching largest output power supported by a power class of the UE, the UE uniformly allocates the first sending power to the antenna ports where the first signal has non-zero transmission of data; otherwise, after performing scaling on the first sending power through a second scale factor, the UE uniformly allocates the first sending power to the antenna ports where the first signal has non-zero transmission of data. The second scale factor is a ratio of the quantity of the antenna ports where the first signal has non-zero transmission of data to the largest quantity of the antenna ports contained in one SRS resource supported by the UE.

After performing scaling on the first sending power through a third scale factor, the UE uniformly allocates the first sending power to the antenna ports where the first signal has non-zero transmission of data. The third scale factor is a ratio of the quantity of the antenna ports where the first signal has non-zero transmission of data to the quantity of the antenna ports contained in the SRS resources indicated by the scheduling information of the first signal. The first sending power refers to the sending power worked out by the UE according to the uplink power control formula.

The UE will use a power control policy corresponding to the quantity of the antenna ports contained in the SRS resources indicated by the scheduling information of the first signal.

After performing scaling on the first sending power through a fourth scale factor, the UE uniformly allocates the first sending power to each antenna port sending the first signal. The fourth scale factor is a scale coefficient self-defined by the UE.

In one embodiment, the first transmission mode includes at least one of the following modes.

The UE will adopt CDD to send the first signal.

The UE will adopt different delays on different coherent transmission antenna groups.

One antenna port sending the first signal of the UE corresponds to at least two antenna ports contained in the SRS resources indicated by the SRI.

The UE transmits the first signal after precoding the first signal through a pre-defined precoding matrix.

In one embodiment, the first indication message further indicates at least one piece of the following information: the codebook subset restriction information corresponding to the first signal; the quantity of transmission streams corresponding to the first signal; a precoding matrix information number corresponding to the first signal; or the SRS resources corresponding to the first signal.

In one embodiment, the UE further includes: a detecting device.

The detecting device is configured to detect the codebook subset restriction information indicated by the first indication message, determine a codebook subset according to the codebook subset restriction information and send the first signal based on the codebook subset; or the detecting device is configured to detect the quantity of the transmission streams indicated by the first indication message, and the UE sends the first signal based on the quantity of the transmission streams; or the detecting device is configured to detect the precoding matrix information number indicated by the first indication message, and the UE determines a precoding matrix based on the precoding matrix information number and sends the first signal after precoding the first signal based on the precoding matrix.

In one embodiment, the first indication message further indicates the quantity of the transmission streams of the first signal and indicates the UE to send the first signal by adopting the quantity of the transmission streams indicated by the first indication message; or the first indication message further indicates the UE to send the first signal by adopting a default quantity of transmission streams for the UE.

In one embodiment, the first indication message further indicates the quantity of the transmission streams of the first signal and indicates the UE to send the first signal by adopting the quantity of the transmission streams indicated by the first indication message.

The determining device is further configured to determine the precoding matrix corresponding to the quantity of the transmission streams in a self-defining mode based on the quantity of the transmission streams and send the first signal based on the precoding matrix; or an adopting device is configured to send the first signal by adopting a default precoding matrix corresponding to the quantity of the transmission streams.

In one embodiment, the first signal includes: a PUSCH or a PUCCH.

The present application provides a computer storage medium, storing a computer program thereon, and the above signal transmission methods are implemented when the computer program is executed by a processor.

The embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, an optical memory and the like) containing computer available program codes.

The present application is described with reference to the flow diagram and/or block diagram of the method, device (system), and computer program product according to the embodiments of the present application. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow diagram and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

What is claimed is:

1. A signal transmission method, comprising:
   determining, by a network device, a first indication message, wherein the first indication message is configured to indicate a user equipment (UE) to send a first signal by using a first power control policy and/or a first transmission mode and indicate codebook subset restriction information corresponding to the first signal; and
   sending, by the network device, the first indication message to the UE;
   wherein the first power control policy comprises:
   the UE is configured to perform scaling on first sending power through a first scale factor and then uniformly allocate the first sending power to each antenna port sending the first signal; wherein the first scale factor is a ratio of a quantity of antenna ports where the first signal has non-zero transmission of data to a quantity of antenna ports contained in sounding reference signal (SRS) resources indicated by scheduling information of the first signal; or the UE is configured to perform scaling on first sending power through a third scale factor, and then uniformly allocate the first sending power to antenna ports where the first signal has non-zero transmission of data; wherein the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

2. The method according to claim 1, wherein the first indication message is carried in a first field of downlink control information (DCI).

3. The method according to claim 2, wherein the first field is at least one of the following: a pre-defined field, a precoding information and stream quantity field, a sounding reference signal resource indicator (SRI) field, or a demodulation reference signal (DMRS) port indication field of the DCI.

4. The method according to claim 2, wherein the first field comprises a plurality of states, wherein different states in the plurality of states indicate different first power control policies and/or first transmission modes to send the first signal.

5. The method according to claim 1, wherein the first indication message is further configured to indicate at least one piece of following information:
   a quantity of transmission streams corresponding to the first signal;
   a precoding matrix information number corresponding to the first signal; or
   SRS resources corresponding to the first signal.

6. The method according to claim 1, wherein the first power control policy and/or the first transmission mode comprises:
   a power control policy that the UE is configured to send the first signal with full power; and/or
   a transmission mode that the UE is configured to send the first signal with full power.

7. A signal transmission method, comprising:
   receiving, by a user equipment (UE), a first indication message sent by a network device, wherein the first indication message is configured to indicate the UE to send a first signal by using a first power control policy and/or a first transmission mode and indicate codebook subset restriction information corresponding to the first signal;
   determining, by the UE, the first power control policy and/or the first transmission mode based on the first indication message; and
   sending, by the UE, the first signal based on the first power control policy and/or the first transmission mode;
   wherein the first power control policy comprises:
   the UE is configured to perform scaling on first sending power through a first scale factor and then uniformly allocate the first sending power to each antenna port sending the first signal; wherein the first scale factor is a ratio of a quantity of antenna ports where the first signal has non-zero transmission of data to a quantity of antenna ports contained in sounding reference signal (SRS) resources indicated by scheduling information of the first signal; or the UE is configured to perform scaling on first sending power through a third scale factor, and then uniformly allocate the first sending power to antenna ports where the first signal has non-zero transmission of data; wherein the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

8. The method according to claim 7, wherein the first indication message is carried in a first field of downlink control information (DCI).

9. The method according to claim 8, wherein the first field is at least one of the following: a pre-defined field, a precoding information and stream quantity field, a sounding reference signal resource indicator (SRI) field, or a demodulation reference signal (DMRS) port indication field of the DCI.

10. The method according to claim 8, wherein the first field comprises a plurality of states, wherein different states in the plurality of states indicate different first power control policies or first transmission modes.

11. The method according to claim 7, wherein the first indication message is configured to indicate at least one piece of following information:
a quantity of transmission streams corresponding to the first signal;
a precoding matrix information number corresponding to the first signal; or
SRS resources corresponding to the first signal.

12. The method according to claim 7, wherein the first power control policy and/or the first transmission mode comprises:
a power control policy that the UE is configured to send the first signal with full power; and/or
a transmission mode that the UE is configured to send the first signal with full power.

13. A network device, comprising:
a memory, configured to store an instruction;
a processor, configured to perform the method according to claim 1.

14. The network device according to claim 13, wherein the first power control policy and/or the first transmission mode comprises:
a power control policy that the UE is configured to send the first signal with full power; and/or
a transmission mode that the UE is configured to send the first signal with full power.

15. The network device according to claim 13, wherein the first indication message is carried in a first field of downlink control information (DCI).

16. The network device according to claim 15, wherein the first field is a pre-defined field, or a precoding information and stream quantity field, or a sounding reference signal resource indicator (SRI) field, or a demodulation reference signal (DMRS) port indication field of the DCI.

17. A user equipment (UE), comprising:
a transceiver, configured to receive a first indication message sent by a network device, wherein the first indication message is configured to indicate the UE to send a first signal by using a first power control policy and/or a first transmission mode and indicate codebook subset restriction information corresponding to the first signal;
a memory, configured to store an instruction; and
a processor, configured to read the instruction in the memory to determine the power control policy and/or the transmission mode based on the first indication message; wherein
the transceiver is further configured to send the first signal by using a first sending power based on the power control policy and/or the transmission mode;
wherein the first power control policy comprises:
the UE is configured to perform scaling on first sending power through a first scale factor and then uniformly allocate the first sending power to each antenna port sending the first signal; wherein the first scale factor is a ratio of a quantity of antenna ports where the first signal has non-zero transmission of data to a quantity of antenna ports contained in sounding reference signal (SRS) resources indicated by scheduling information of the first signal; or
the UE is configured to perform scaling on first sending power through a third scale factor, and then uniformly allocate the first sending power to antenna ports where the first signal has non-zero transmission of data; wherein the third scale factor is a ratio of a quantity of the antenna ports where the first signal has non-zero transmission of data to a quantity of the antenna ports contained in SRS resources indicated by scheduling information of the first signal, and the first sending power refers to sending power worked out by the UE according to an uplink power control formula.

18. The UE according to claim 17, wherein the first power control policy and/or the first transmission mode comprises:
a power control policy that the UE is configured to send the first signal with full power; and/or
a transmission mode that the UE is configured to send the first signal with full power.

19. The UE according to claim 17, wherein the first indication message is carried in a first field of downlink control information (DCI).

20. The UE according to claim 19, wherein the first field is a pre-defined field, or a precoding information and stream quantity field, or a sounding reference signal resource indicator (SRI) field, or a demodulation reference signal (DMRS) port indication field of the DCI.

* * * * *